United States Patent
Bullard, Jr.

[11] Patent Number: 5,583,976
[45] Date of Patent: Dec. 10, 1996

[54] TELECOMMUNICATIONS NETWORK CONFIGURATION MODEL FOR DATA MANAGEMENT AND ALLOCATION

[75] Inventor: Walter G. Bullard, Jr., Atlanta, Ga.

[73] Assignee: BellSouth Corporation, Atlanta, Ga.

[21] Appl. No.: 198,860

[22] Filed: Feb. 18, 1994

[51] Int. Cl.$^6$ .................................................. G06T 11/00
[52] U.S. Cl. ......................... 395/140; 395/326; 379/112
[58] Field of Search .................................. 395/140, 155, 395/159, 160, 161, 500; 379/59, 94, 96, 112, 201, 207, 210, 221, 230, 242, 269, 284; 370/16, 58.1, 62; 455/54

[56] References Cited

U.S. PATENT DOCUMENTS

| | | | |
|---|---|---|---|
| 4,685,125 | 8/1987 | Zave | 379/96 |
| 4,736,402 | 4/1988 | Landis | 379/16 |
| 4,747,127 | 5/1988 | Hansen et al. | 379/94 |
| 4,805,209 | 2/1989 | Baker, Jr. et al. | 379/96 |
| 4,919,545 | 4/1990 | Yu | 380/25 |
| 4,926,495 | 5/1990 | Comroe et al. | 455/54 |
| 4,942,602 | 7/1990 | Baker, Jr. et al. | 379/212 |
| 4,984,234 | 1/1991 | Vergnaud et al. | 370/58.1 |
| 5,008,929 | 4/1991 | Olsen et al. | 379/112 |
| 5,008,930 | 4/1991 | Gawrys et al. | 379/210 |
| 5,056,086 | 10/1991 | Libonati | 370/62 |
| 5,153,907 | 10/1992 | Pugh et al. | 379/143 |
| 5,182,744 | 1/1993 | Askew et al. | 370/16 |
| 5,193,110 | 3/1993 | Jones et al. | 379/94 |
| 5,212,727 | 5/1993 | Ramkumar | 379/221 |
| 5,241,588 | 8/1993 | Babson, III et al. | 379/201 |
| 5,251,255 | 10/1993 | Epley | 379/242 |
| 5,282,244 | 1/1994 | Fuller et al. | 379/230 |
| 5,285,494 | 2/1994 | Sprecher et al. | 379/59 |
| 5,315,646 | 5/1994 | Babson, III et al. | 379/201 |
| 5,323,452 | 6/1994 | Dickman et al. | 379/201 |

Primary Examiner—Almis R. Jankus
Attorney, Agent, or Firm—James L. Ewing, IV; Kilpatrick & Cody

[57] ABSTRACT

Processes and devices for improving data management and reallocation in intelligent networks. Such processes and devices provide intuitive representation of models of data stored in network elements so that system users may more efficiently and reliably reallocate applications and data resources among the network elements. Users see and allocate data using high level depictions of groups of network element data structures based on data structure models. These groups may be hierarchical, and they may correspond to groups within the telecommunications network such as digits in a telephone number and local calling areas. Applications and data resources may accordingly be reallocated among network elements in a more organized fashion using the groups. These organized groups also allow engineering operations personnel more easily to coordinate with translation personnel to make proper changes to translation tables in order to accommodate the data reallocation.

23 Claims, 20 Drawing Sheets

TELECOMMUNICATIONS NETWORK CONFIGURATION MODEL FOR DATA MANAGEMENT AND ALLOCATION

The present invention relates to improved management and allocation of data in intelligent network elements, such as those found in telecommunications networks, via efficient and intuitive data model representations.

BACKGROUND OF THE INVENTION

Common channel signaling networks such as Signalling System 7 ("SS7") networks create potential for a wide variety of new telecommunications services and features. Recent enhancements to these networks, such as intelligent network capacity, expand that potential. Examples of intelligent networks are the BellSouth Advanced Intelligent Network ("AIN") and AT&T intelligent networks. Network elements of these intelligent networks, such as Service Control Points ("SCPs") and Service Nodes ("SNs"), contain applications and data resources that support these services and features. One category of such applications is known in AT&T terminology, for instance, as a Service Package Application ("SPA"). One type of SCP data resource is conventionally referred to as a Database.

The intelligent network according to one paradigm provides intelligence to the signalling system switches. Very briefly, for example, a switch corresponding to a certain called number, when it receives routing for a call to that number can, in its Service Switching Point ("SSP"), trigger a "query." The query is communicated ultimately across the network to the SCP that contains applications and/or data resources relevant to the services in effect for the called number. Data from the SCP is then returned to the switch to provide those services.

The intelligent network may contain multiple SCPs whose applications or data resources may or may not correspond to customers or subscribers in their corresponding geographic areas. For instance, an intelligent network covering several states may be adequately served with a handful of SCPs which may be located remotely from each other and to accommodate traffic volume, accessibility, and other factors conveniently.

Data in these network elements is conventionally managed, at least to some extent, in a centralized fashion through an Operation Support System sometimes known as a Service Management System. That system is networked to the various network elements including SCPs and SNs. Service Management System users are, therefore, in a position to make changes to network element applications and data resources from a centralized location. The changes are then distributed efficiently and reliably to the various network elements. These changes may be, for instance, changes caused by introduction of a new service, changes in a service, network growth, the network itself, new subscribers, the desires of a particular subscriber or other factors.

These types of changes and demands also create a continuing need to reallocate applications and database resources among the network elements. Reallocation is often indicated, for instance, to resolve network element overload, balance network element loads, or otherwise improve network performance. Reallocation in conventional intelligent networks can be disruptive and logistically complex, however, even if performed orderly and efficiently.

SUMMARY OF THE INVENTION

Processes and devices according to the present invention provide intuitive representations of models of data stored in network elements so that system users may more efficiently and reliably reallocate applications and data resources among the network elements. Users see and allocate data using high level depictions of network element data structures based on data structure models, rather than being confronted with conventional screens of virtually raw data which can intimidate and bewilder the user who is unversed in the niceties of the data structures of all of the SCPs and SNs on the network.

Service Management Systems according to the present invention create a set of data models for each network element. Each model corresponds to an application, a set of applications, a data resource or a set of data resources. As presented, the Models may be divided into at least two categories: "Areas of Service" Models ("AOSs") associated with applications and Mapping models ("Mappings") associated with data resources. The AOSs and Mappings may be further subdivided into two SetTypes: $SetType_L$ whose Members are pre-defined by operations personnel (such as in the same LATA), and $SetType_N$, whose Members are not (such as in the same part of a LATA). The SetType Members may each comprise a set of Telephone Numbers or numbers that correspond to them. The Members may, but need not, correspond to exchanges within area codes. The Telephone Numbers may, but need not, correspond to Global Title Values of the Signaling Connection Control Part of the SS7 query generated by a Service Switching Point upon encountering an Advanced Intelligent Network Trigger, and thus correspond to subscribers. The groupings may be further subdivided as desired within the Models, either vertically or horizontally so that, for instance, a new SetType may be added to accommodate a Sub LATA predefined set of Telephone Numbers, or Members may be formally subdivided vertically into groups, first according to area code then according to exchange.

Users thus see orderly groupings of the Telephone Numbers. They can accordingly evaluate, manipulate and reallocate groups of data at a number of conceptually straightforward levels, including hierarchically if desired, by Telephone or corresponding Number, Member, SetType, Model and network element levels (and other levels if desired, hierarchically or non-hierarchically). Furthermore, data may be moved between network elements in an organized fashion, and network translations personnel can make proper changes to translation tables in an organized and scheduled manner, according to these Models and groups.

It is accordingly an object of the present invention to present network element data structure in intuitive fashion at the Service Management System level using groupings corresponding to network element data based on models of that data in order to facilitate reallocation of application and resource data to the network elements.

It is an additional object of the present invention to provide Service Management Systems users a medium for experimenting with potential network element data allocations in a fashion that allows them to simulate performance before the allocation is implemented.

It is a further object of the present invention to model, manage and distribute network element data in a flexible, efficient, reliable and intuitive manner using models of that data and groupings based on those models, which groupings may be hierarchical if desired.

Other objects, features and advantages of the present invention will become apparent with reference to the remainder of this document.

DETAILED DESCRIPTION

Background

Figure 1:
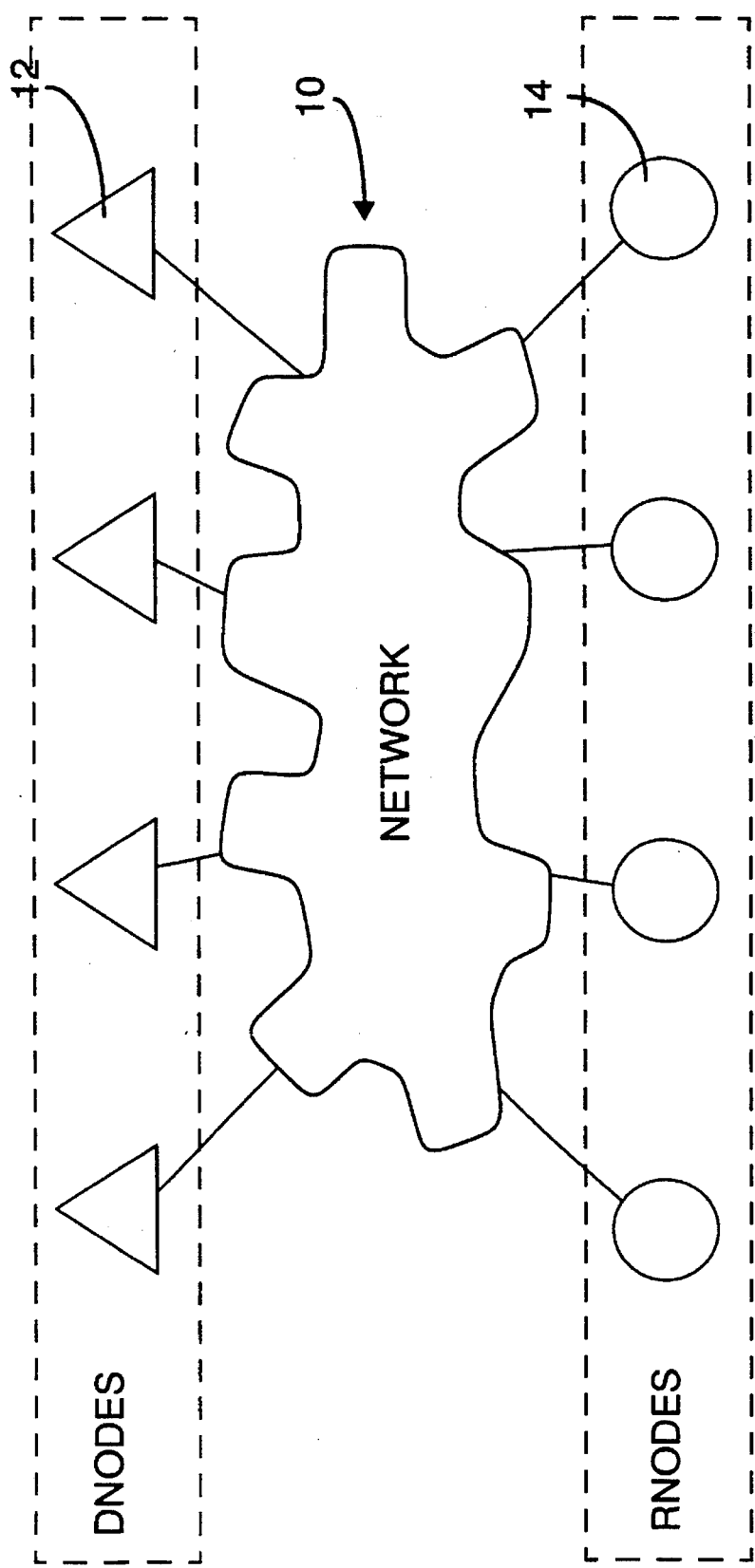
FIG. 1 is a schematic representation of a relationship between networked DNodes and RNodes in an intelligent network.

FIG. 1 is a high level representation of a network 10 according to the present invention. Network 10 may, but need not be, a conventional intelligent network such as, for instance, a BellSouth or AT&T Signalling System 7 network, or it may assume various forms in the future for which the processes and devices of the present invention are well suited. Network 10 includes any desired number of Data Nodes ("DNodes") 12 and Request Nodes ("RNodes") 14. RNodes 14 are typically adapted to send Requests to DNodes 12 in order to provide a Service. RNodes 14 may, but need not be, network elements such as conventional AIN Service Switching Points ("SSPs"). DNodes 12 may, but need not be, network elements such as conventional AT&T A-I-Net™ Service Control Points ("SCPs") or Service Nodes ("SNs"). A Request may be, for instance, an SS7 Transaction Capabilities Application Part (TCAP) SS7 query generated by an SSP upon encountering an AIN Trigger, such as prior to Global Title Translation.

Figure 2:
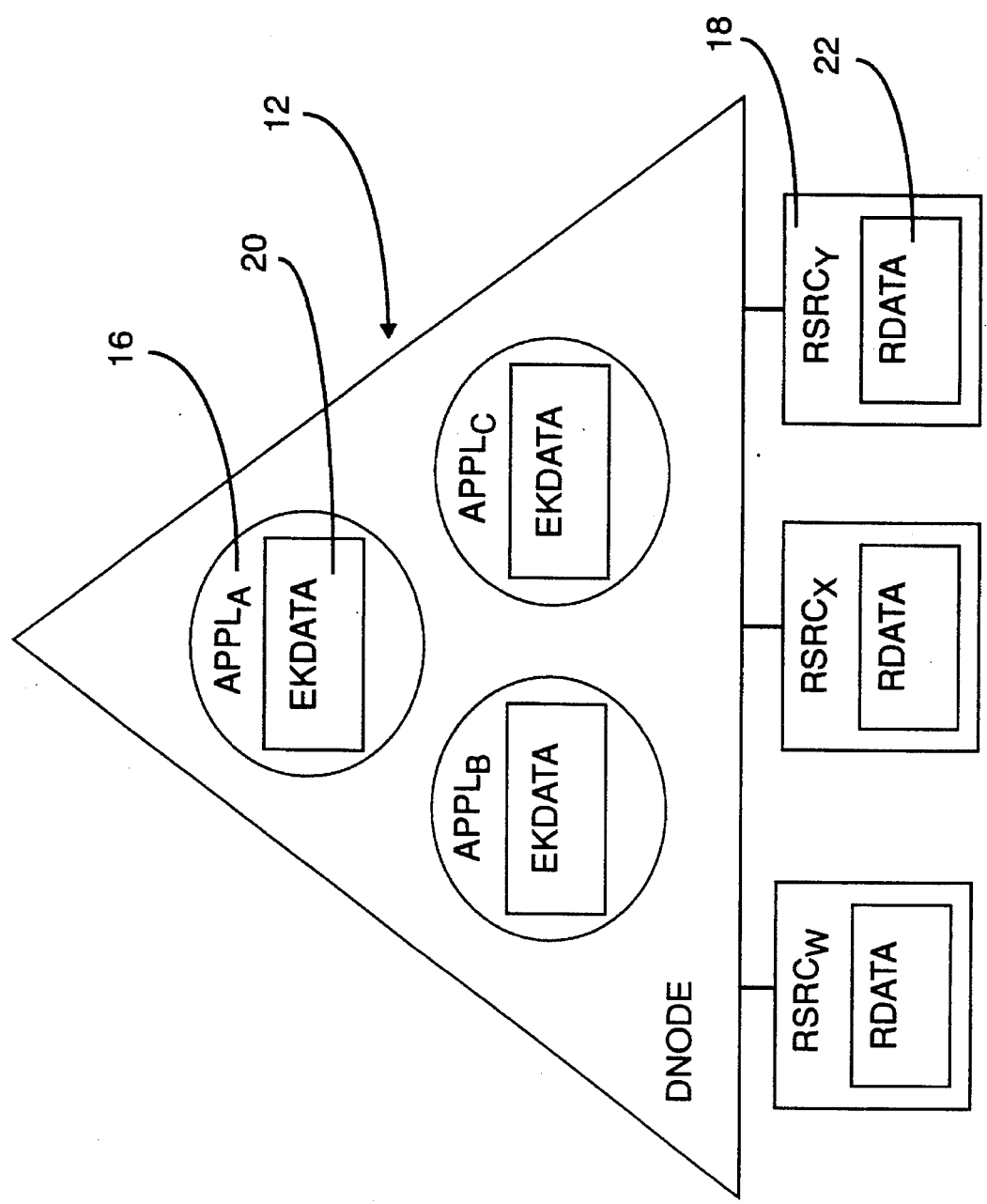
FIG. 2 is a schematic representation of a relationship between Applications, EKData, Resources and RData in a DNode according to a preferred embodiment of the present invention.

As shown in FIG. 2, everal Applications 16 may be resident on a particular DNode 12, as may be one or more Resources 18. Applications 16 are adapted each to provide different services to the RNodes 14. Applications 16 may be, for instance, conventional Service Package Applications ("SPAs") such as found in an AT&T A-I-Net™ SCP. Depending on the characteristics of a particular Request, an Application 16 may be invoked on a particular DNode 12. For a given Application 16 on a DNode 12, the specific functionality provided in the Application 16 depends on the characteristics of the Request and the specific set of information utilized at the DNode 12 in the Request processing. An Application 16 may have access to one or more Resources 18 at the DNode 12 to aid in Request processing. Resources 18 may be, for instance, conventional Databases such as found in an AT&T A-I-Net™ SCP (which may be implemented via a Service Circuit Handler).

Each Application 16 on a DNode 12 may utilize data of at least two types: Entry Key data ("EKData") 20 or Resource data ("RData") 22. These are shown in FIG. 2. EKData 20 is associated with a single Application 16, whereas RData 22 is associated with a single Resource 18. EKData 20 may be, for instance, Subscription Data such as that in an SPA at an AT&T A-I-Net™ SCP. RData 22 may be, for instance, "Shared Data" such as that in an AT&T A-I-Net™ SCP (which may be implemented via a Service Circuit Handler). Both data types can be utilized by the DNodes 12 when they are processing Requests from RNodes 14. EKData 20 is the primary data that is accessed in processing a Request at the DNode 12 from an RNode 14. Based on the EKData 20, the DNode may determine that it is necessary to access a Resource in order to utilize RData 22 in processing that Request.

Each piece of EKData 20 has associated with it a "Key" which corresponds to the TN (as discussed below) used in routing the Request associated with that data through the network 10. The EKData Key may be, for instance, the Access Number associated with a Subscription in an AT&T A-I-Net™ SCP. Each piece of RData 22 also has associated with it a "Key"; however, the RData Key is not involved in routing Requests through the network. The RData Key may be, for instance, a six or ten digit "Key" field of a record in a Database such as that found in an AT&T A-I-Net™ SCP.

The network 10 is responsible for routing Requests from RNodes 14 to the appropriate DNodes 12. A single Request will be routed to a single DNode 12, though DNodes 12 may be deployed in a mated configuration for reliability purposes. The information used by the network 10 to route a Request to the appropriate DNode 12 is translations information based on a set of parameters in the Request, referred to as the Routing Key ("RK"). An RK consists of two parts: a Translations Table Identifier ("TTI") and a Translation Number ("TN") 23. A Routing Key may be, for instance, the Global Title Address of the SS7 query generated by an SSP upon encountering an AIN Trigger (prior to Global Title Translation). The Translations Table Identifier may be the Translation Type of the Signaling Connection Control Part ("SCCP") of the SS7 query, while the Translation Number may be the Global Title Value of the SCCP part of the SS7 query.

The network 10 uses the TTI to determine which Translations Table ("TTbl") to utilize in translations, and it then uses the TN 23 as the key into the table. The Translations Table may, but need not be, the Translations Table in the Signal Transfer Point ("STP") of an SS7 network. For the TTI/TN combination, the TTbl will provide a DNode 12 address and an Application ID. Those may be, respectively, the Destination Point Code ("DPC") of the SCP and the Subsystem Number (SSN) of the SPA at the destination SCP, as found in the SCCP part of the SS7 query generated by an SSP upon encountering an AIN Trigger (after Global Title Translation). When the DNode 12 receives a Request, it uses some combination of the ApplicationID and the TN 23 to access the correct Application 16 in the DNode 12 and the corresponding EKData 20 for that Application 16. Each Application 16 also has access to a determinate number of Resources 18. Each Resource 18 manages a set of RData 22 which is specific to that Resource 18. The DNode 12 uses parameters in the Request, EKData 20 and RData 22 to process the Request and return a response to the RNode 14.

Operations personnel weigh various criteria in order to determine which DNode 12 to associate with a particular TTI/TN combination. Once operations personnel have made this determination, they provide this information to the network 10 by updating its translations information.

Introduction

The operations support system ("OSS") or Service Management System ("SMS") is responsible for deploying EKData 20 and RData 22 to the appropriate DNodes 12. The present invention addresses this need by, among other things, enhancing management of this data in the network so that:

a. Engineering operations personnel can easily and hypothetically enter and display a desired allocation of EKData 20 and RData 22 among the various DNodes 12.

b. Those personnel can be assured that the allocation which they have entered and displayed is valid in that all RData 22 needed by an Application 16 on the DNode 12 will reside on it.

c. Those personnel can easily re-allocate data among the various DNodes 12 as needed.

d. Re-allocation of EKData 20 and RData 22 between two DNodes may be accomplished without the loss of Requests in the network 10.

e. Allocations can be made flexibly, efficiently and reliably based on different Applications 16 that exist in the DNodes 12. For example, the OSS should allow an allocation of one Application 16's EKData 20 independent of the allocation of another Application 16's EKData 20.

f. Network translations information may be provided to the network translations operations personnel in a manner that allows them to update that information based upon the allocation made by the engineering operations personnel. Thus, the present invention allows the OSS to be the single master of the information regarding the appropriate allocation of EKData 20 and RData 22 among the DNodes 12. It also allows this information to be made available with sufficient lead time to allow network translations personnel to schedule in advance for future re-allocation activity. This information or corresponding information may alternatively be communicated and employed automatically to update tables such as TTbls and otherwise change network translations as desired to reflect reallocation.

g. Allocation of EKData 20 and RData 22 may be performed in a "safe" environment. Such functionality allows a user to modify the allocation of a DNode 12 or a set thereof, view the changes, produce reports on the changes for distribution among various operations personnel, re-modify the allocation (if need be), and only at a later date "commit" or implement the change (i.e., cause EKData 20 and RData 22 to be moved between DNodes 12 based on the reallocation).

Framework and Approaches

Networks according to the present invention employ sets of "Models" 25 in the OSS to address these concerns. A Model 25 is a collection of TNs 23 for an Application 16, a set of Applications 16, a Resource 18 or a set of Resources 18. Models 25 may be of two (or more, if desired) types: Areas of Service ("AOSs") 24 which are associated with Applications and Mappings ("Mappings") 26 which are associated with Resources. Models 25 may be or correspond to collections of conventional Network Data Objects and in the preferred embodiment are such collections.

Figure 3:
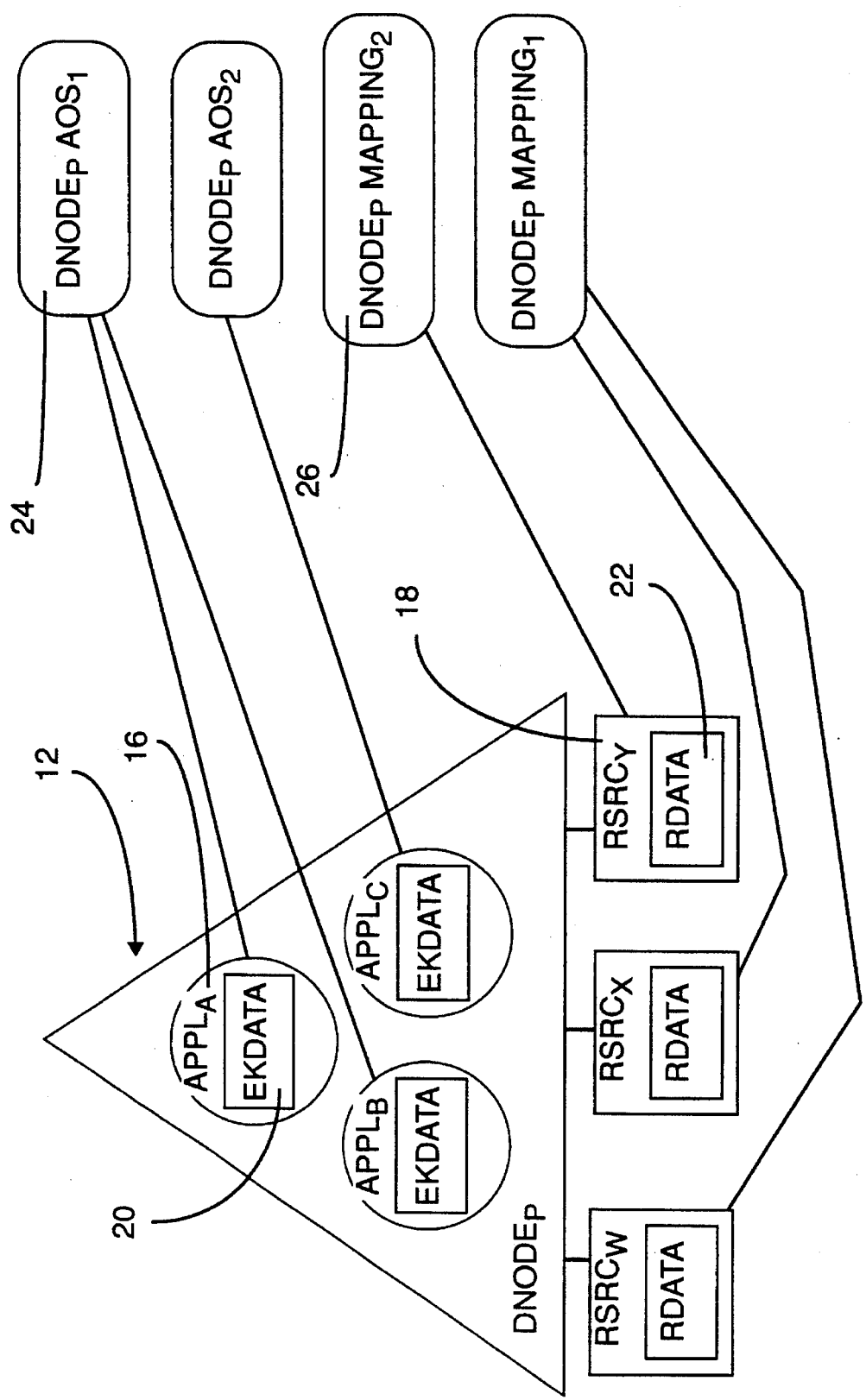
FIG. 3 is a schematic representation of various Models and the applications and data resources they represent in a particular DNode according to a preferred embodiment of the present invention.
Figure 4:
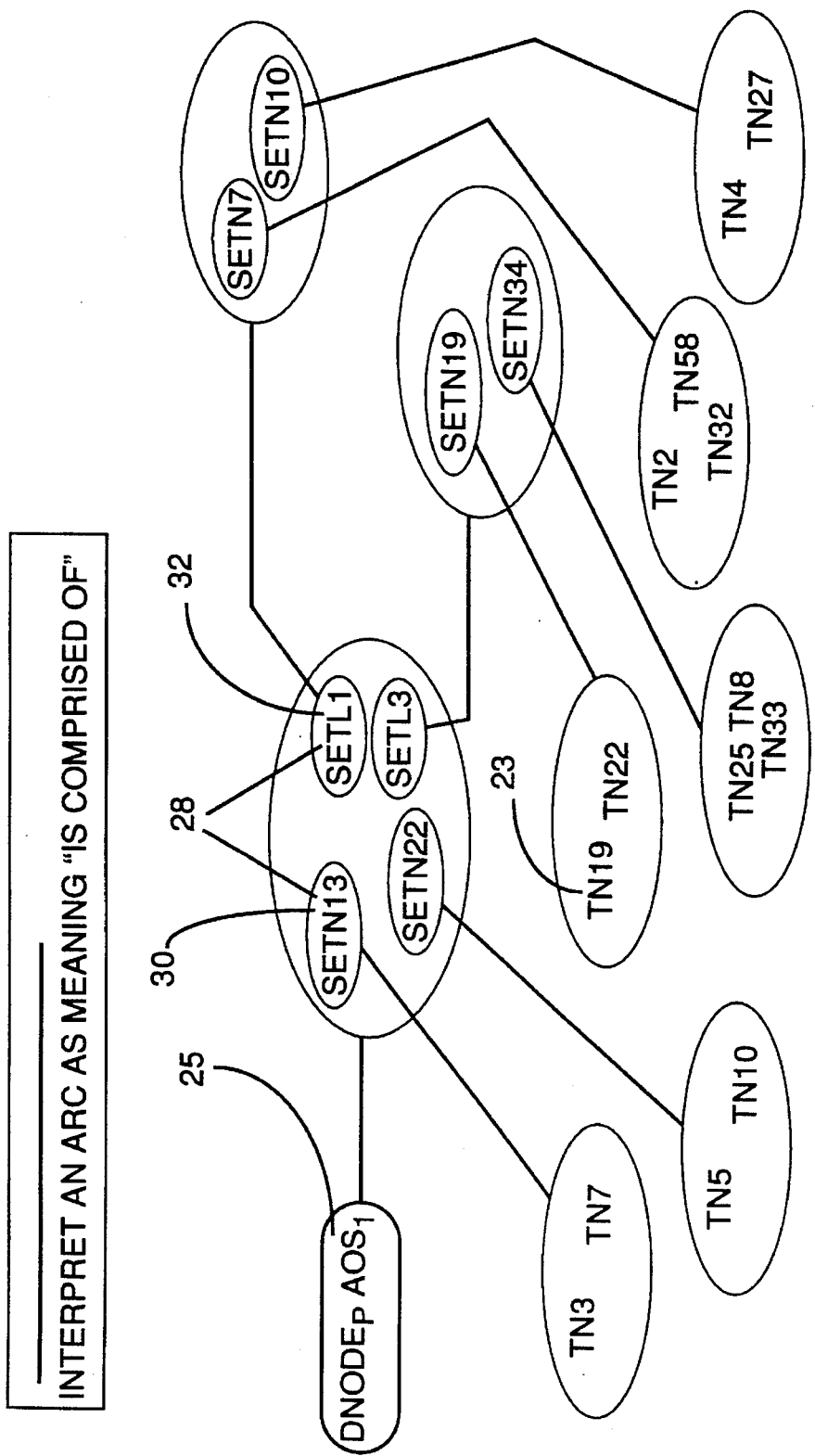
FIG. 4 is a schematic representation of a relationship between Models, SetTypes and TNs according to a preferred embodiment of the present invention.

For example, as shown in FIG. 3, the OSS might support two AOSs 24, ($AOS_1$ and $AOS_2$) and two Mappings 26 ($Mapping_1$ and $Mapping_2$). $AOS_1$ in this example is associated with $Application_A$ and $Application_B$ while $AOS_2$ is associated with $Application_C$. $Mapping_1$ in the example is associated with $Resource_W$ and $Resource_X$, while $Mapping_2$ is associated with $Resource_Y$. Each DNode 12 preferably has associated with it at least one AOS 24 of each type supported by the OSS, as well as at least one Mapping 26 of each type supported by the OSS>

Following this example shown in FIG. 3, DNode 12 (and preferably each DNode 12 in the network 10) has (at least) two AOSs 24, $AOS_1$ and $AOS_2$, and two Mappings 26, $Mapping_1$ and $Mapping_2$, associated with it (depending on the AOSs 24 and Mappings 26 that may be associated with other DNodes 12 in the network 10).

The OSS supports at least two types of set 28 via which TNs 23 can be allocated to the various DNode AOSs 24 and Mappings 26: $SetType_N$ 30 and $SetType_L$ 32. Each Member of $SetType_N$ 30 may be, for instance, a six digit number. The TNs 23 that are associated with a Member of $SetType_N$ 30 would be those TNs 23 the first six digits of which match the six digits of that Member. Each Member of $SetType_L$ 32 may also be a collection of six digit numbers. The six digit numbers that are associated with a Member of $SetType_L$ 32 are preferably of the type that is pre-defined based on the needs of the engineering operations personnel using the OSS, such as corresponding to a LATA.

A Model 25 may contain both $SetTypes_L$ 30 and $SetTypes_N$ 30. If a Model 25 contains a Member of $SetType_N$ 30, then that Model 25 would implicitly contain all possible TNs 23 associated with that Member. If a Model 25 contains a Member of $SetType_L$ 32, then that Model 25 would implicitly contain all six digit patterns associated with that Member (and, thus, all TNs 23 associated with those six digit patterns).

The OSS is the master of all EKData 20 and RData 22 according to the present invention. Inserts, updates, and deletes to this data are disseminated to the appropriate DNode(s) 12. The information that the OSS utilizes in determining to which DNode(s) 12 to distribute a piece of data is contained in the DNode AOSs 24 (for EKData 20) and Mappings 26 (for RData 22).

The OSS will distribute a piece of EKData 20 to a DNode 12 if the "Key" for that piece of EKData 20 is implicitly contained (as a TN 23) in the AOS 24 of the DNode corresponding to the Application 16 with which the EKData 20 is associated. Similarly, the OSS will distribute a piece of RData 22 to a DNode 12 if the "Key" for that piece of RData 22 is implicitly contained (as a TN 23) in the Mapping 26 of that DNode corresponding to the Resource 18 with which the RData 22 is associated.

Operations engineering personnel may use the following criteria in constructing AOSs 24 for DNodes 12, as an example. The engineering personnel determine, based upon forecast and historical information, the anticipated Request volume associated with a set 28 of TNs 23 (either of $SetType_L$ 32 or $SetType_N$ 30) for the set of Applications 16 associated with an AOS 24. Engineering personnel can also determine the EKData 20 memory requirements associated with each such set 28 of TNs 23. They must also determine the amount of supporting RData 22 which need to be resident on a DNode 12 in order to provide service to a particular set 28 of TNs 23. Based upon at least this information, the engineering personnel can determine which sets 28 of TNs 23 (of either SetType$_L$ 32 or SetType$_N$ 30) should be associated with each DNode 12 so that processing load is more evenly distributed across the DNodes 12 and so that no DNode 12 is overloaded in either processing or memory demands. Once this set of TNs 23 is determined, engineering personnel may assign the set 28 of TNs 23 to the AOS 24 for that DNode 12. Note that the set 28 of TNs 23 will correspond to one or more sets of SetType$_L$ 32 or SetType$_N$ 30.

Once the AOS 24 for a DNode 12 is determined, engineering personnel determine which Mappings 26 should be associated with DNode 12, considering, among other things, RData 22 that needs to reside on the DNode 12 in order to accommodate the Application or Applications 16 corresponding to the AOS 24. Each Application 16 may have associated with it a set of Application-specific rules which determine, for a particular TN 23 supported on the Application's DNode 12, the particular set of RData 22 which must be available to the associated EKData 20 for Request processing. Based upon these application specific rules, the engineering personnel may determine which TNs 23 (associated with the RData 22) should be included in the corresponding Mapping 26. Note once again that the set of TNs 23 will correspond to one or more sets of SetType$_L$ 32 or SetType$_N$ 30.

Modifying Contents of Models

Figure 5:
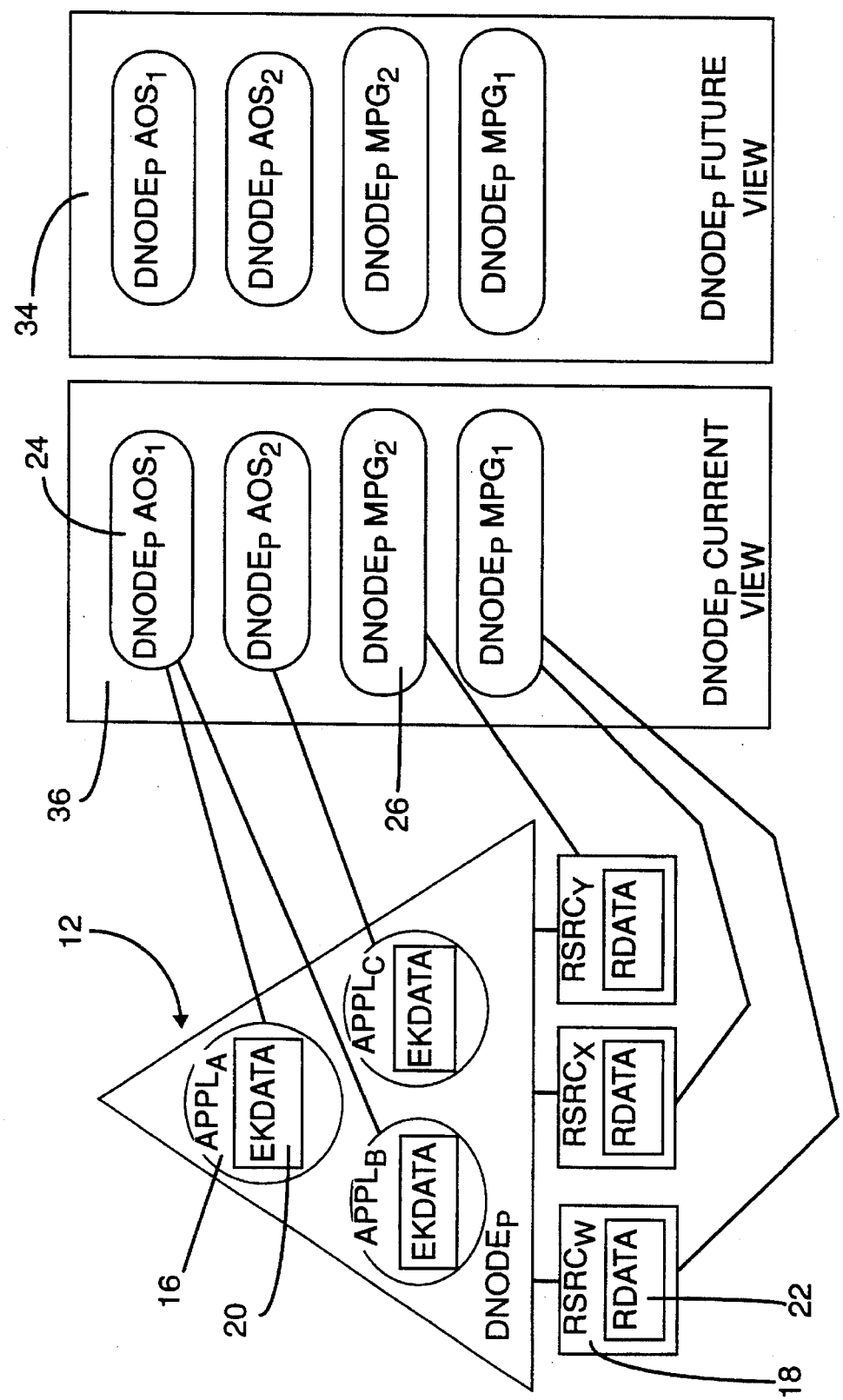
FIG. 5 is a schematic representation of a relationship between a Current View and a Future View of a Model according to a preferred embodiment of the present invention.

In order that changes to a Model 25 for a DNode 12 can be made in a "safe" manner, each DNode 12 may have associated with it at least one "Future View" 34 as shown, for example, in FIG. 5. The OSS presents Future Views 34 (as it may the other views and displays discussed herein) on provisioning interfaces associated with the OSS, preferably via intuitive high level representation on a graphic user interface, and based upon Models 25. Symbols, icons and other aspects of the display may be selected and utilized as desired in an effort to render more intuitive the relationship among DNodes, Models, Set Types, Set Members and TN's (which may, but need not be, hierarchical). The representations shown in FIGS. 6–13 and 16–19 are schematic views of one type of such presentation, but others may also be used. In a DNodes' Future View 34 as shown schematically in FIG. 5, that DNode 12 may have associated with it a single AOS 24 of each type supported by the OSS, as well as a single Mapping 26 of each type supported by the OSS. These AOSs 24 and Mappings 26 will be used as "temporary work space" in which a user may alter them and their Set Types. The only way to modify a DNode's AOS 24 or Mapping 26 is preferably through a Future View.

In order to distinguish the "Future View" 34 set of Models from the "real" set of Models which are used in the distribution of EKData and RData, the later Models are referred to as the "Current View" 36 Models.

A user can create a DNode's Future View 34 via a "Create Future View" operation. This operation will create a Future View 34 with the associated AOSs 12 and Mappings 26 for that DNode 12. Each AOS 12 and Mapping 26 in the Future View 34 would initially contain the associated Members (of either SetType$_N$ 30 or SetType$_L$ 32) that were present in the DNode's Current View 36 at the time the "Create Future View" operation was executed. After the user has modified the AOSs 24 and Mappings 26 as desired, the user could perform an "Activate Future View" operation which replaces the Current View AOSs 24 and Mappings 26 with the associated Members (of either SetType$_N$ 30 or SetType$_L$ 32) as contained in the Future View 34. If there are special relationships between the AOSs 24 and/or Mappings 26 for a single DNode 12, then an operation, "Validate Future View," may be used to initiate OSS validations. The OSS may also support an operation, "Generate Future View Report, " which may be distributed to operations support personnel who need to schedule their workload for the impending changes to the AOSs 24 and/or Models 25. Information of this type or corresponding information may alternatively be communicated and employed automatically to update tables such as TTbls and otherwise change network translations as desired to reflect reallocation.

Operations on Models

The OSS preferably supports at least four operations with which to define the contents of a Model 25. These operations may be referred to as the "Expand," "Reduce," "Begin Transfer" and "End Transfer" operations. The user modifies each AOS 24 or Mapping 26 utilizing one of these operations, preferably only in a Future View 34. The "Activate Future View" operation may be used to actuate those changes to the Current View Models 25.

The "Expand" operation may be used to associate a Member (of either SetType$_N$ 30 or SetType$_L$ 32) with a DNode 12 for a specified Model 25, in the event that the Member is not currently associated with any other DNode 12 for that same Model 25 (such as, for example, where a service is being made available to additional new subscribers). The "Reduce" operation may be used to disassociate a Member (of either SetType$_N$ 30 or SetType$_L$ 32) from a DNode 12 for a specified Model 25, in the event that the Member is currently associated with the DNode 12 for that same Model 25. The "Begin Transfer" operation may be used to associate a Member (of either SetType$_N$ 30 or SetType$_L$ 32) with a DNode 12 for a specified Model 25, in the event that the Member is currently associated with another DNode 12 for that same Model 25. The "End Transfer" operation may be used to disassociate a Member (of either SetType$_N$ 30 or SetType$_L$ 32) from a DNode 12 for a specified Model 25, in the event that the Member is currently associated with another DNode 12 for that same Model 25.

The "Expand" operation allows the user to select either (1) a Member of SetType$_L$ 32 which is not associated with any other Dnodes 12 for the Model 25 being operated on, or (2) a Member of SetType$_N$ 30 which is not associated with any other DNodes 12 for the Model 25 being operated on, either explicitly or implicitly via a Member of SetType$_L$ 32. Once such a Member has been selected, the "Expand" operation associates that Member with the DNode 12 for that Model 25 in the DNode's Future View 34.

The "Reduce" operation allows the user to select either (1) a Member of SetType$_L$ 32 which is currently associated with the DNode 12 for the Model 25 being operated on, or (2) a Member of SetType$_N$ 30 which is currently associated with the DNode 12 for the Model 25 being operated on, either explicitly or implicitly via a Member of SetType$_L$ 32. Once such a Member has been selected, the "Reduce" operation dissociates that Member from that DNode 12 for that Model 25 in that DNode's Future View 34.

The "Begin Transfer" operation allows the user to select either (1) a Member of $SetType_L$ 32 which is currently associated with another DNode 12 for the Model 25 being operated on, or (2) a Member of $SetType_N$ 30 which is currently associated with another DNode 12 for the Model 25 being operated on, either explicitly or implicitly via a Member of $SetType_L$ 32. Once such a Member has been selected, the "Begin Transfer" operation associates that Member with the DNode 12 for that Model 25 in that DNode's Future View 34. The DNode 12 with which the Members are currently associated may be referred to as the "Source" DNode 12. The DNode with which the Members will become associated may be referred to as the "Target" DNode 12.

The "End Transfer" operation may be used to select a set of Members of $SetType_L$ 32 or $SetType_N$ 30 that were previously selected via a "Begin Transfer" operation. Once this set has been selected, the "End Transfer" operation disassociates those Members from the Source DNode 12 for that Model 25 in that DNode's Future View 34.

Load Transfer Scenario

Figure 6:
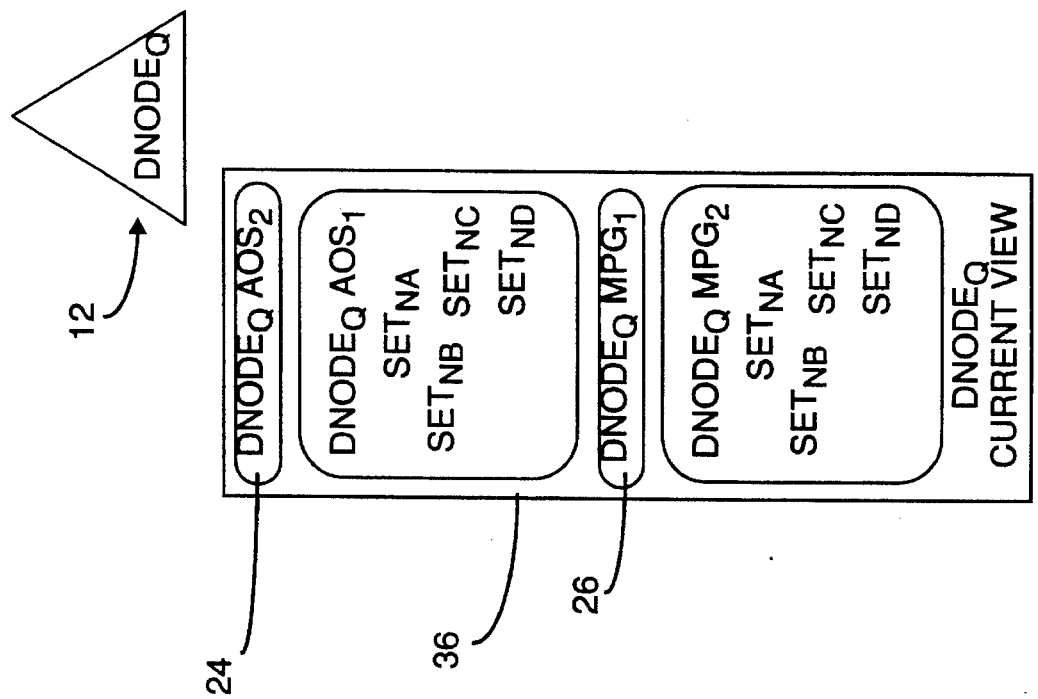
FIGS. 6–13 are schematic representations of interface displays during a data transfer operation according to a preferred embodiment of the present invention.
Figure 6:
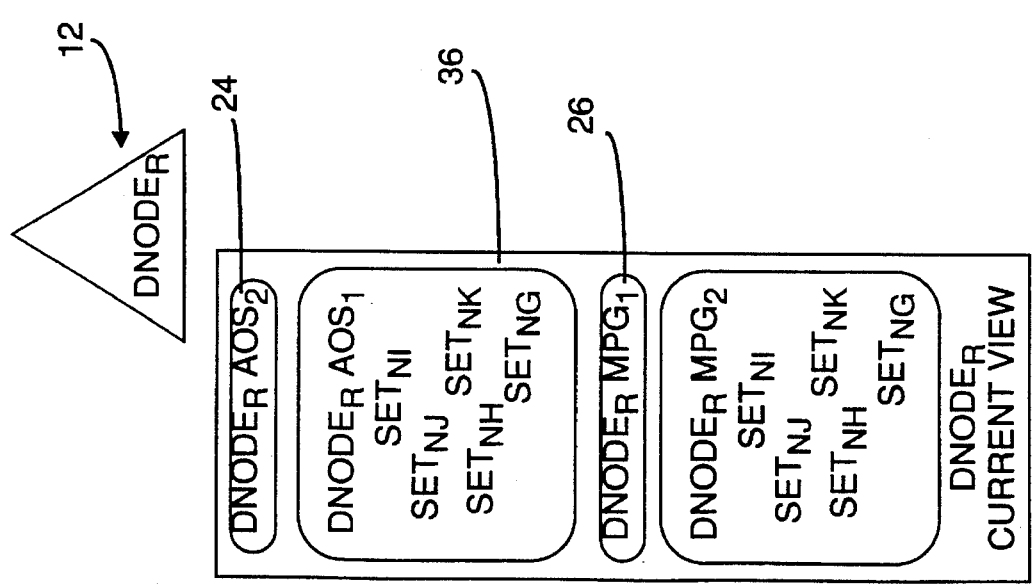
Figure 7:
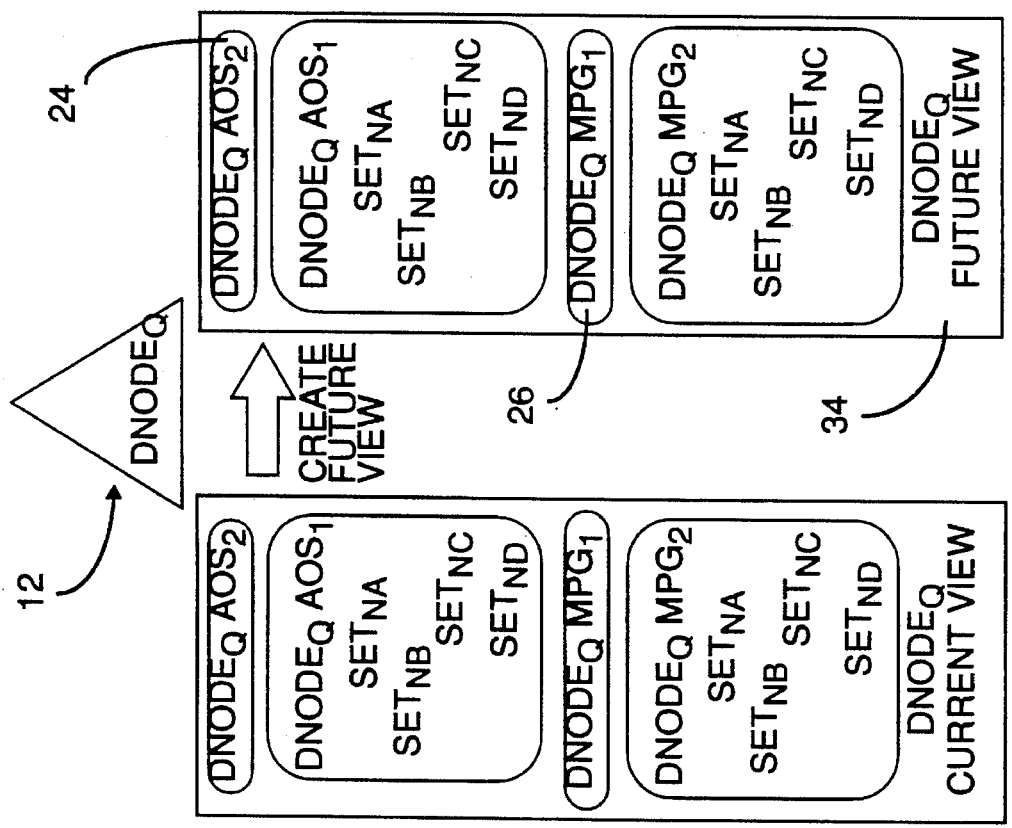
Figure 7:
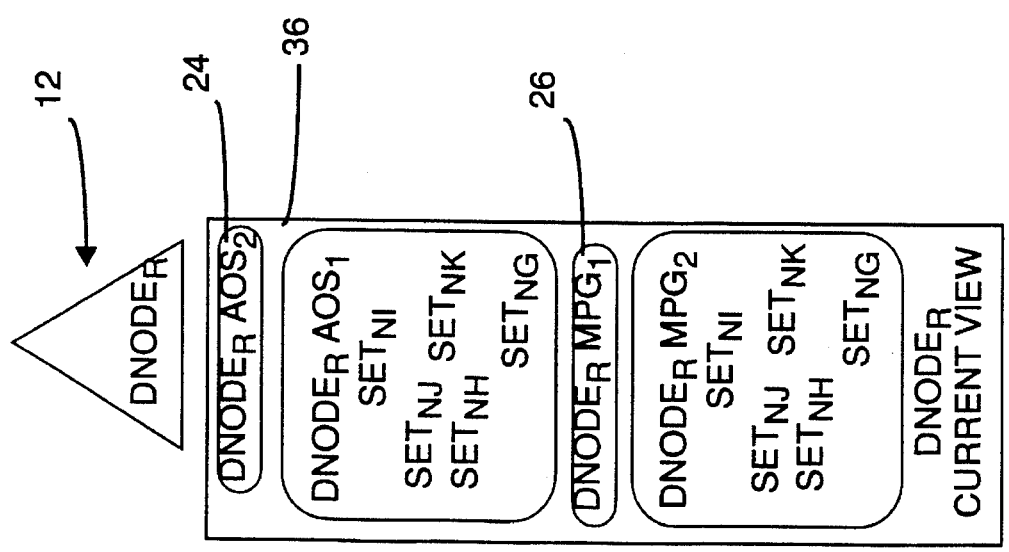
Figure 8:
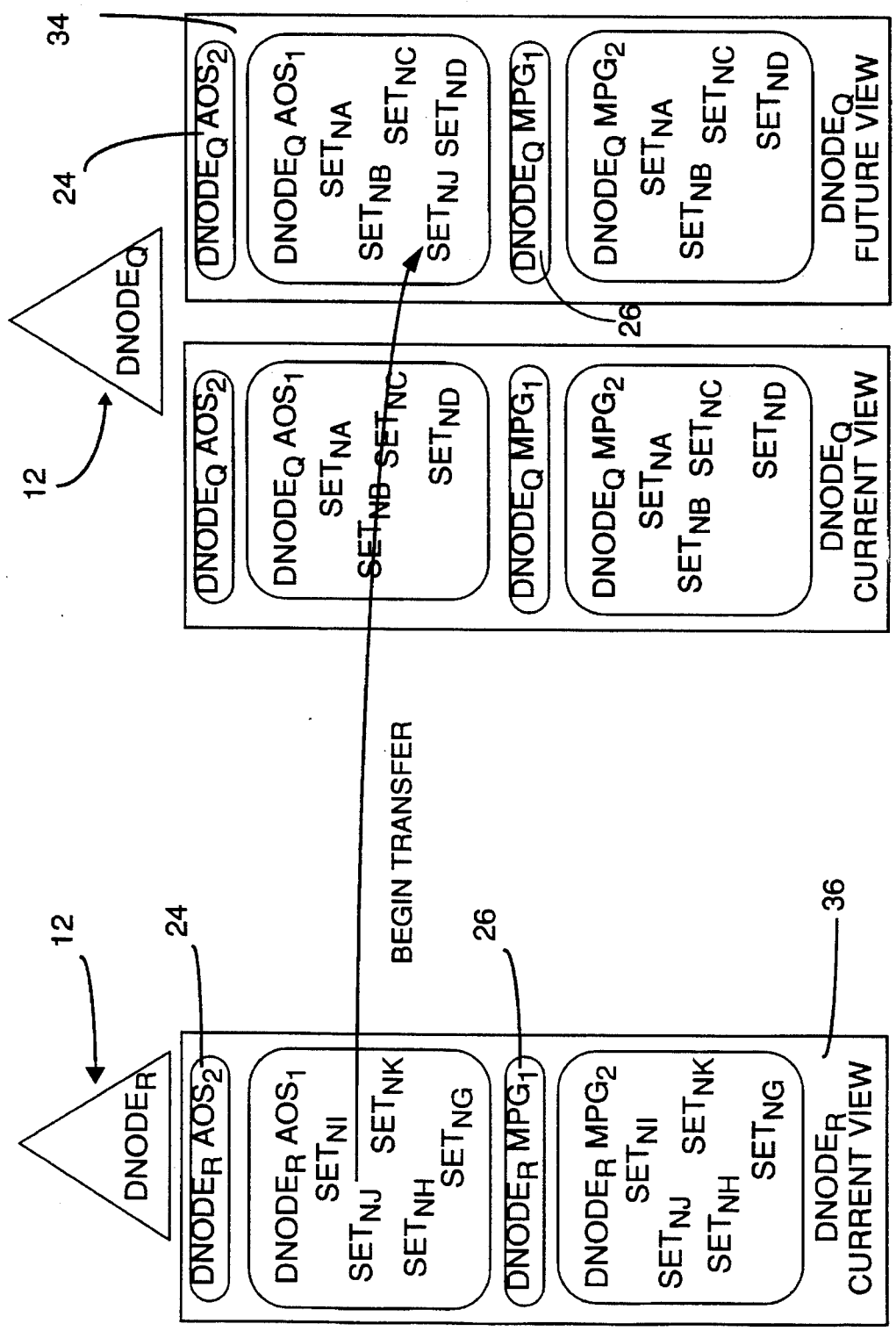
Figure 9:
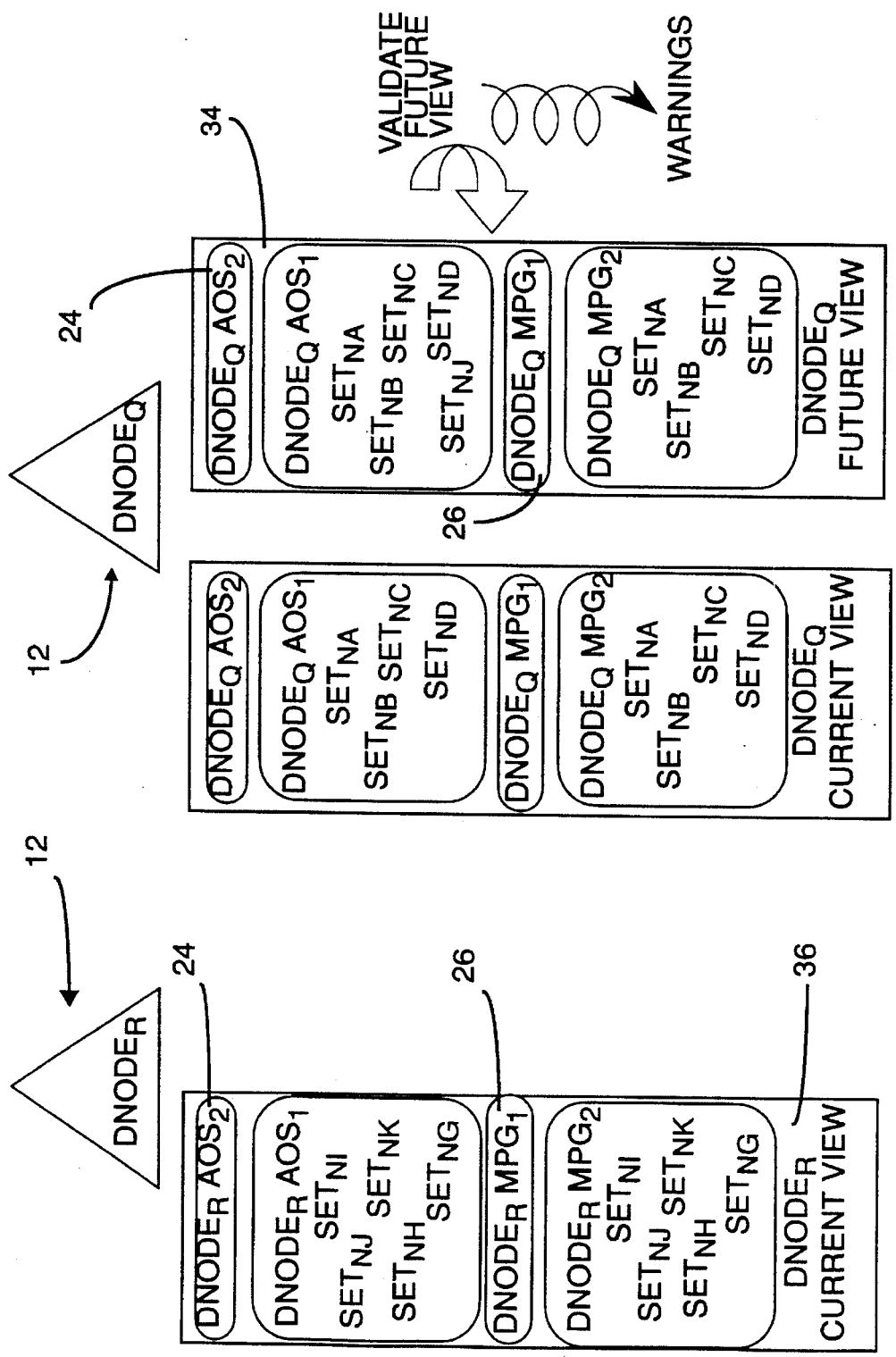
Figure 10:
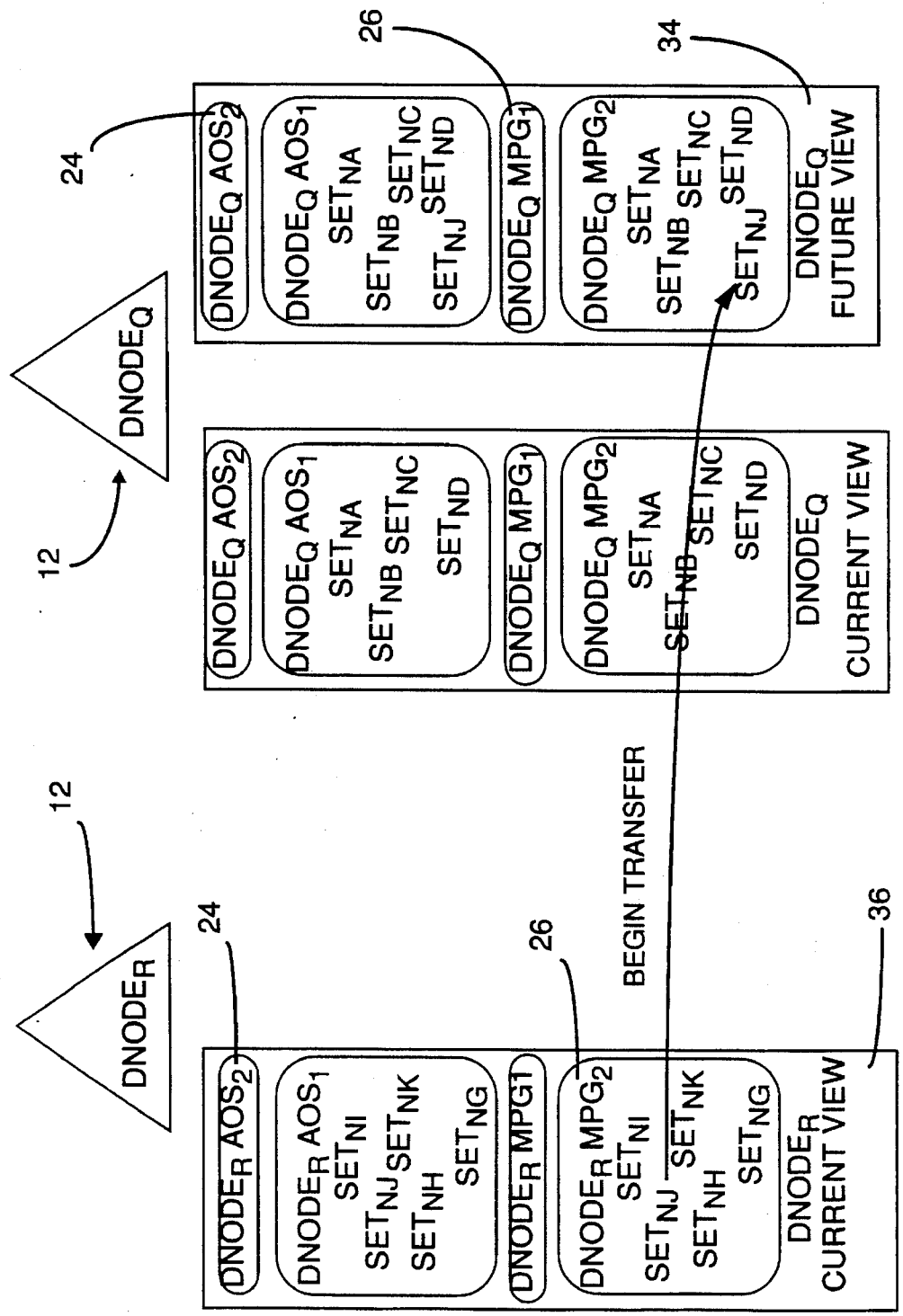

The following scenario helps illustrate the objects, features and advantages of the present invention, although once again the scenario is based on a preferred but nonlimiting embodiment. Assume that a $DNode_R$ experiences an increase, over time, in Request processing load, and it is determined that some of its Request traffic should be off-loaded to $DNode_Q$, which is less heavily loaded. See FIG. 6. Specifically, the TNs 23 in $Set_{Nj}$ for those Applications 16 associated with $AOS_1$ will be transferred. In order to perform such an operation, significant coordination must take place to ensure that the Network Translations change only after the appropriate EKData 20 and RData 22 have been put on $DNode_Q$ in order to support the Requests associated with $Set_{Nj}$. Thus, the steps involved in such an activity would be as follows. Note that the description of each step is accompanied by a high level FIGURE representing the activity which has just occurred. FIG. 6 shows the initial state of the example.

Figure 11:
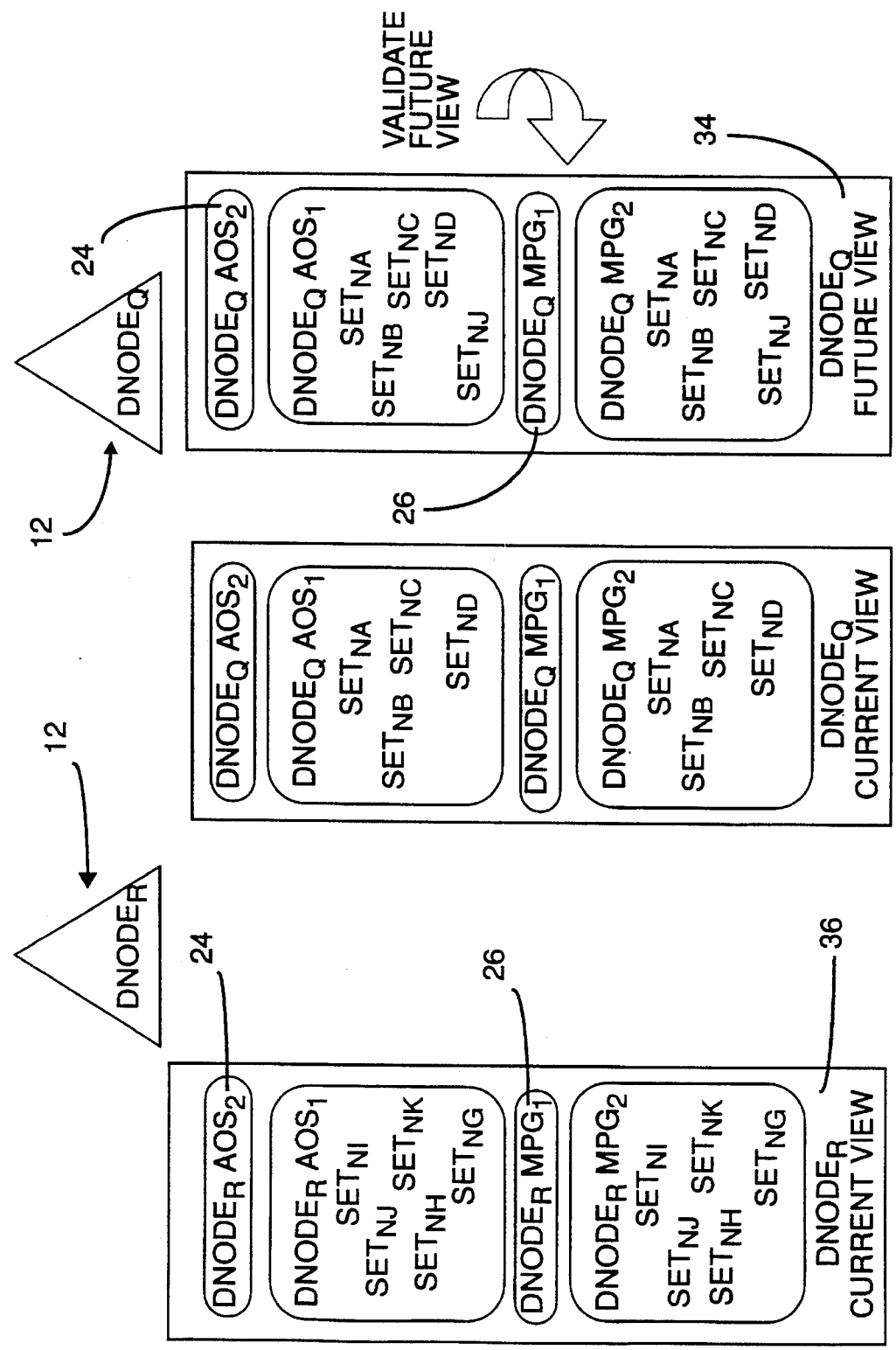
Figure 12:
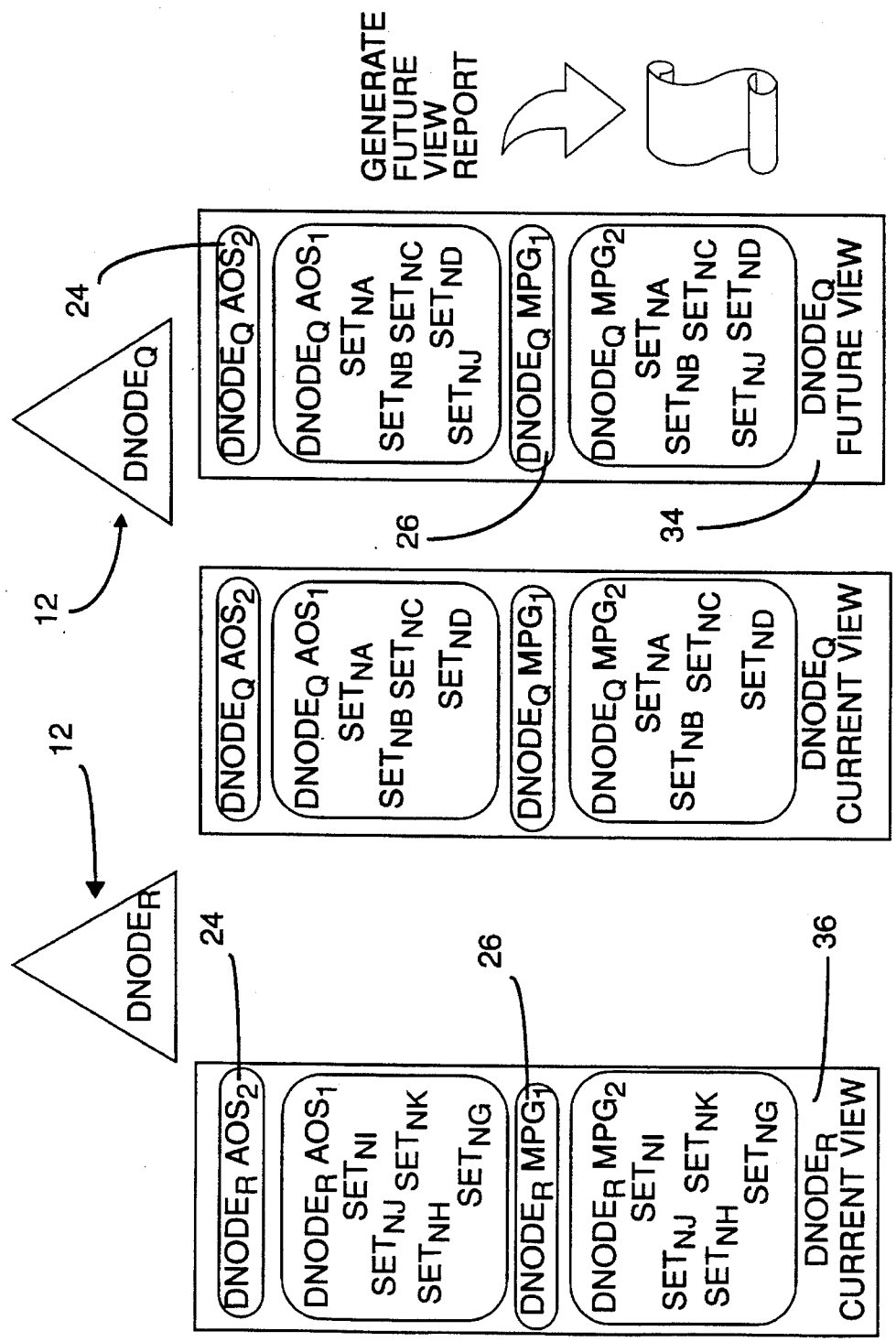
Figure 13:
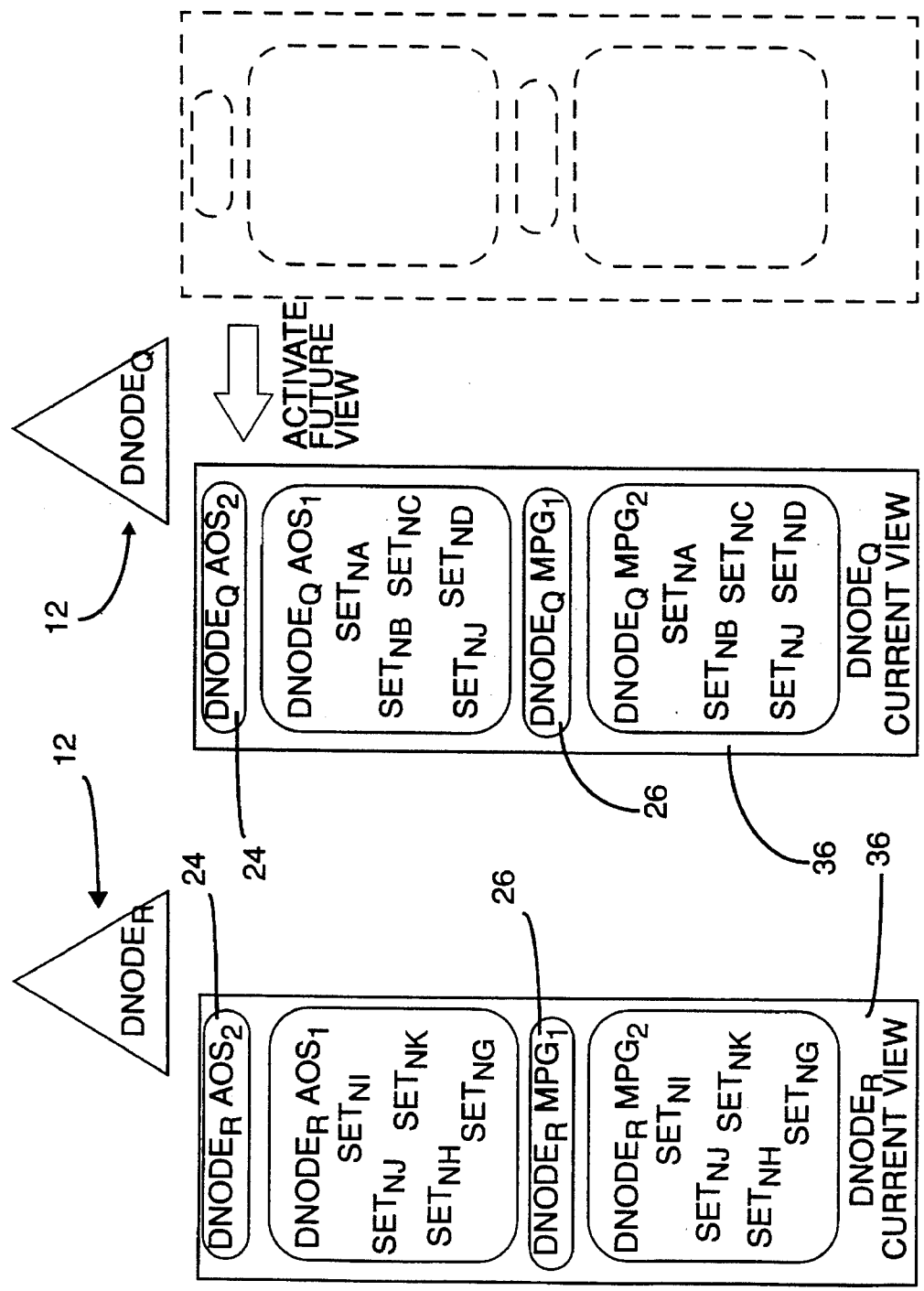
Figure 14:
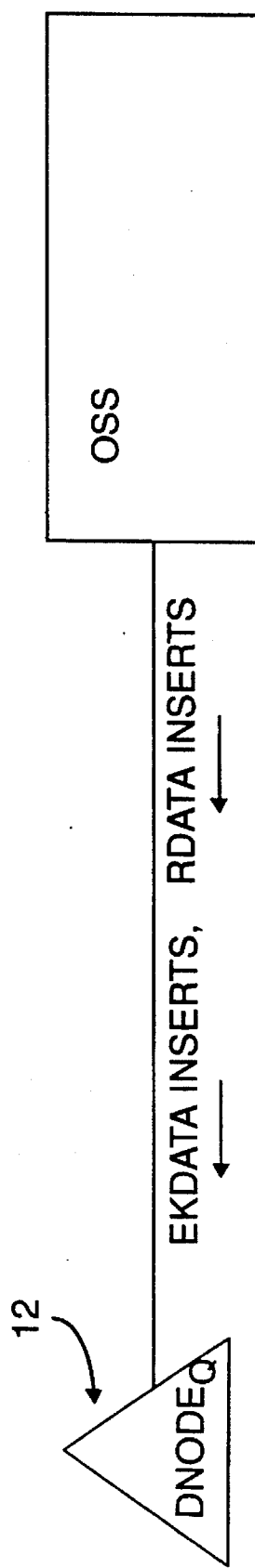
FIG. 14 is a schematic representation of data changes effected according to a preferred embodiment of the present invention.

1. The operations personnel responsible for engineering the traffic load on the DNodes 12 will create a Future View 34 for $DNode_Q$, the Target, as reflected in FIG. 7.
2. As reflected in FIG. 8, in the newly created $DNode_Q$ Future View 34, operations personnel will perform a "Begin Transfer" operation, specifying $DNode_R$, the Source, as the DNode 12 from which Members will be taken. The operations personnel then select $AOS_1$ as the Model 25 which will be operated on, and they select $Set_{Nj}$ as the only Member of this AOS 24 to be operated on. At this point in the $DNode_Q$ Future View 34, $Set_{Nj}$ is now associated with the $DNode_Q$ $AOS_1$.
3. Engineering personnel would then perform a "Validate Future View" operation on the $DNode_0$ Future View 34 as reflected in FIG. 9. This operation may provide warning messages to the personnel, such as those indicating that, for instance: (1) $AOS_1$ supports $Application_A$ and $Application_B$, (2) $Application_B$ utilizes $Resource_Y$ data, and (3) in accordance with $Application_B$-specific validation rules, if $Set_{Nj}$ is a Member of the AOS 24 supporting $Application_B$ on a DNode 12, then that DNode 12 must also contain $Set_{Nj}$ in its $Resource_Y$ Mapping (in this case, $Mapping_2$). Since this is not the case, the engineering personnel would need to remedy the situation in order for the Application 16 to function properly in the network 10.
4. Engineering personnel would again access the $DNode_Q$ Future View 34, as reflected in FIG. 10. In that Future View 34 they will again perform a "Begin Transfer" operation, specifying $DNode_R$ as the DNode 12 from which Members will be taken. The operations personnel would then select $Mapping_2$ as the Model which will be operated on and select $Set_{Nj}$ as the only Member of this AOS to be operated on. At this point in the $DNode_Q$ Future View 34, $Set_{Nj}$ is now associated with the $DNode_Q$ $Mapping_2$.
5. Engineering personnel would then perform a "Validate Future View" operation on the $DNode_Q$ Future View 34 as shown in FIG. 11. This operation no longer produces a warning message, since the Future View 34 has now been made internally consistent in accordance with the Application-specific validation rules.
6. Network translations personnel would then access the $DNode_Q$ Future View 34 to obtain a "Future View Report" as reflected in FIG. 12. This report indicates that the TNs 23 associated with $Set_{Nj}$ will be associated with $DNode_Q$. The report format may provide information such as the following. (1) Each row of the report may identify a TN 23 or a Set 28 Member (of either $SetType_N$ 30 or $SetType_L$ 32) being operated on. (2) Associated with each TN 23 or Set 28 Member may be the address of $DNode_Q$ (with which the TN 23 or Member will be associated). (3) The report may also contain information that specifies in which TTbl to place the new translation, and with which Application ID to associate the new translation. This requires information in the OSS that associates Applications 16 with ApplicationIDs and TTbls. It may also require information in the OSS as to which TNs 23 or Set 28 Members are associated with which ApplicationIDs and TTbls. Network translations personnel may utilize the information on the Future View Report to pre-build translations files which could then be processed by a software script when time to change the network translations. The network translations operation center could also schedule its personnel around the date and time of the change in network translations according to the number of translations being changed. Again, this information or corresponding information may alternatively be communicated and employed automatically to update tables such as TTbls and otherwise change network translations as desired to reflect reallocation.
7. DNode administration personnel would then, at the scheduled time, "Activate" the $DNode_Q$ Future View 34 as reflected in FIG. 13. This will cause the $DNode_Q$ Current View 36 to change in order to reflect the values that were contained in the Future View 34. As a result of the Current View 36 change, the OSS would begin to send the appropriate data to $DNode_Q$. It is expected that the DNode administration personnel would perform the activation function since, with a large influx of data to their machine, they would want to verify at the last minute that the DNode 12 is capable of supporting this influx.
8. Since $Set_{Nj}$ is a new addition to the $DNode_Q$ $AOS_1$, the OSS will begin downloading to $DNode_Q$ EKData 20 with the following characteristics as reflected schematically in FIG. 14: (1) The EKData 20 is associated with the Applications 16 which are associated with $AOS_1$, and (2) the "Key" of that EKData 20 is associated with the TNs 23 in $Set_{Nj}$. Also, since $Set_{Nj}$ is a new addition to the $DNode_Q$ $Mapping_1$, the OSS will begin downloading to $DNode_Q$ all RData 22 having the following characteristics: (1) The RData 22 is associated with the Resources 18 which are associated with the Mapping$_1$, and (2) the "Key" of that RData 22 is associated with the TNs 23 in Set$_{Nj}$.

Figure 15:
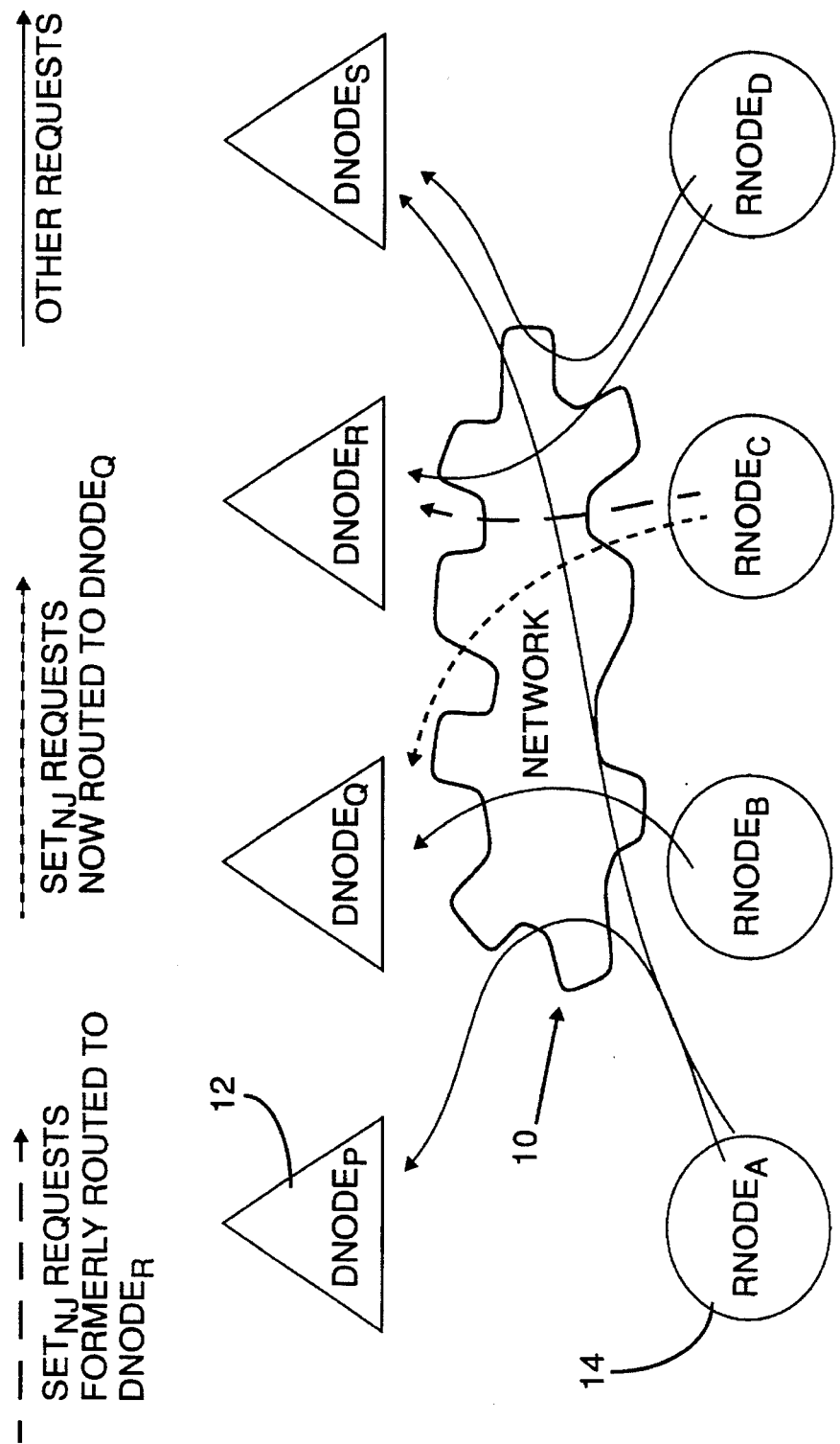
FIG. 15 is a schematic representation showing network translations modified in accordance with a data transfer operation of a preferred embodiment of the present invention.
Figure 16:
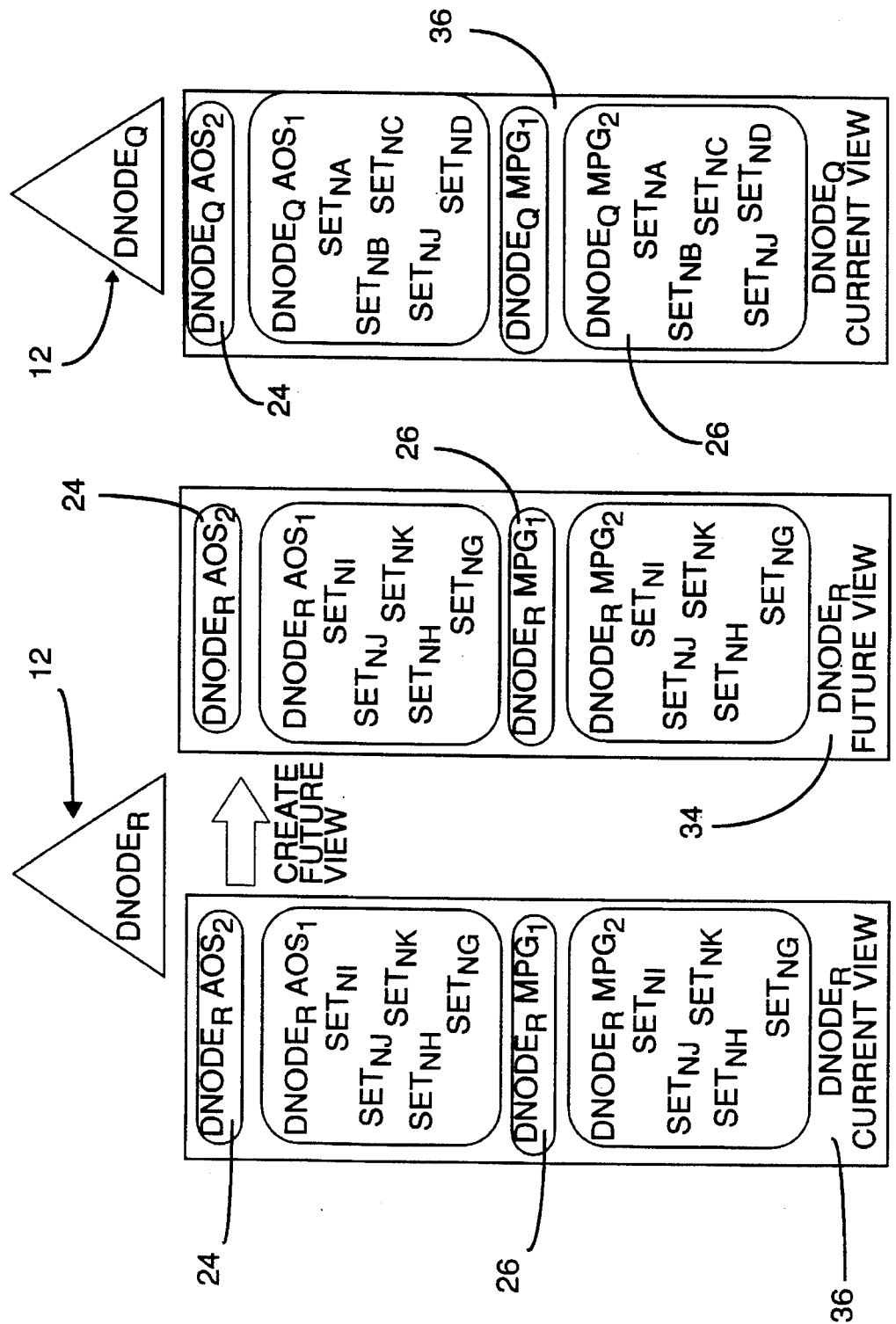
FIGS. 16–19 are schematic representations of interface displays during a data transfer operation according to a preferred embodiment of the present invention.
Figure 17:
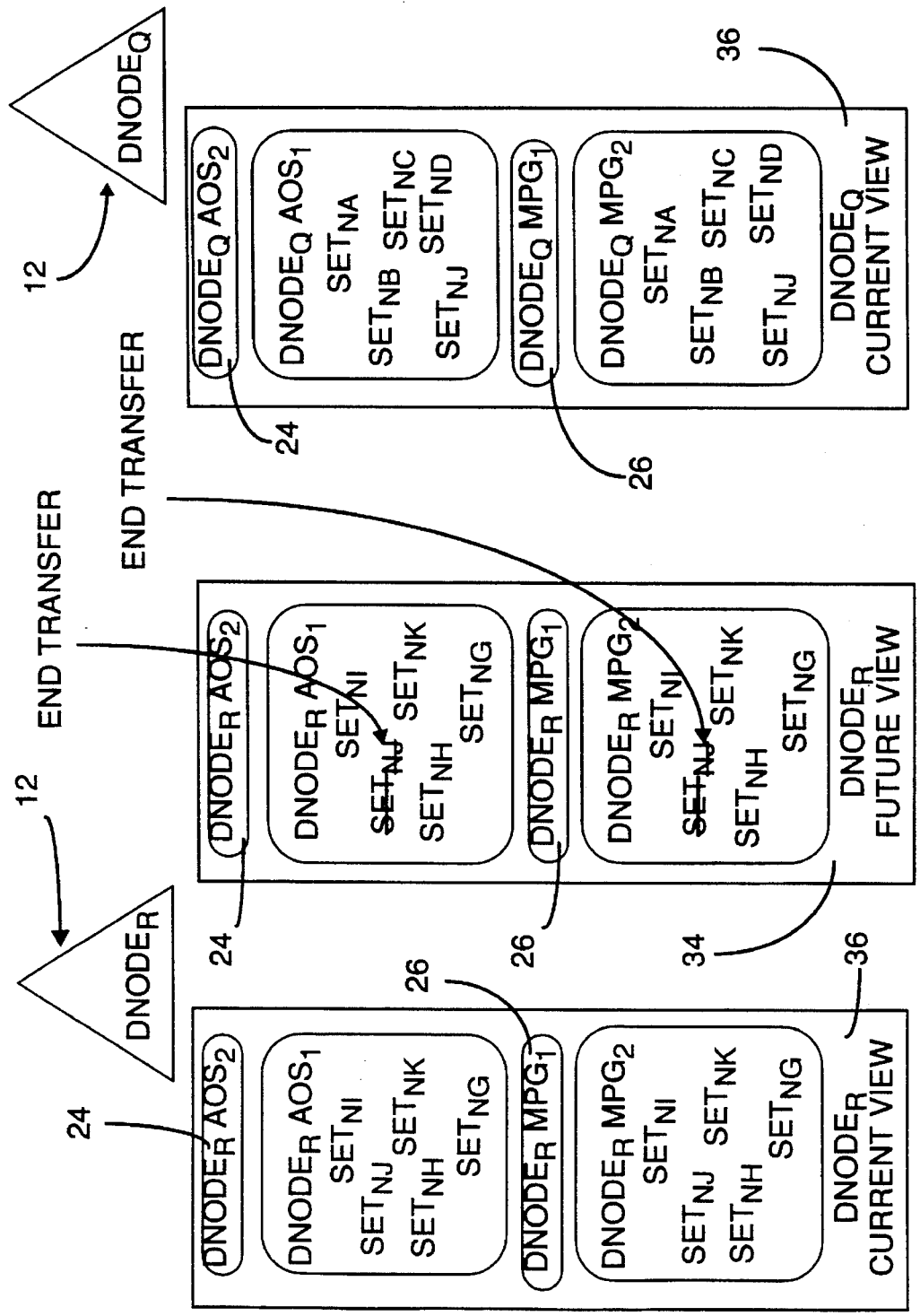
Figure 18:
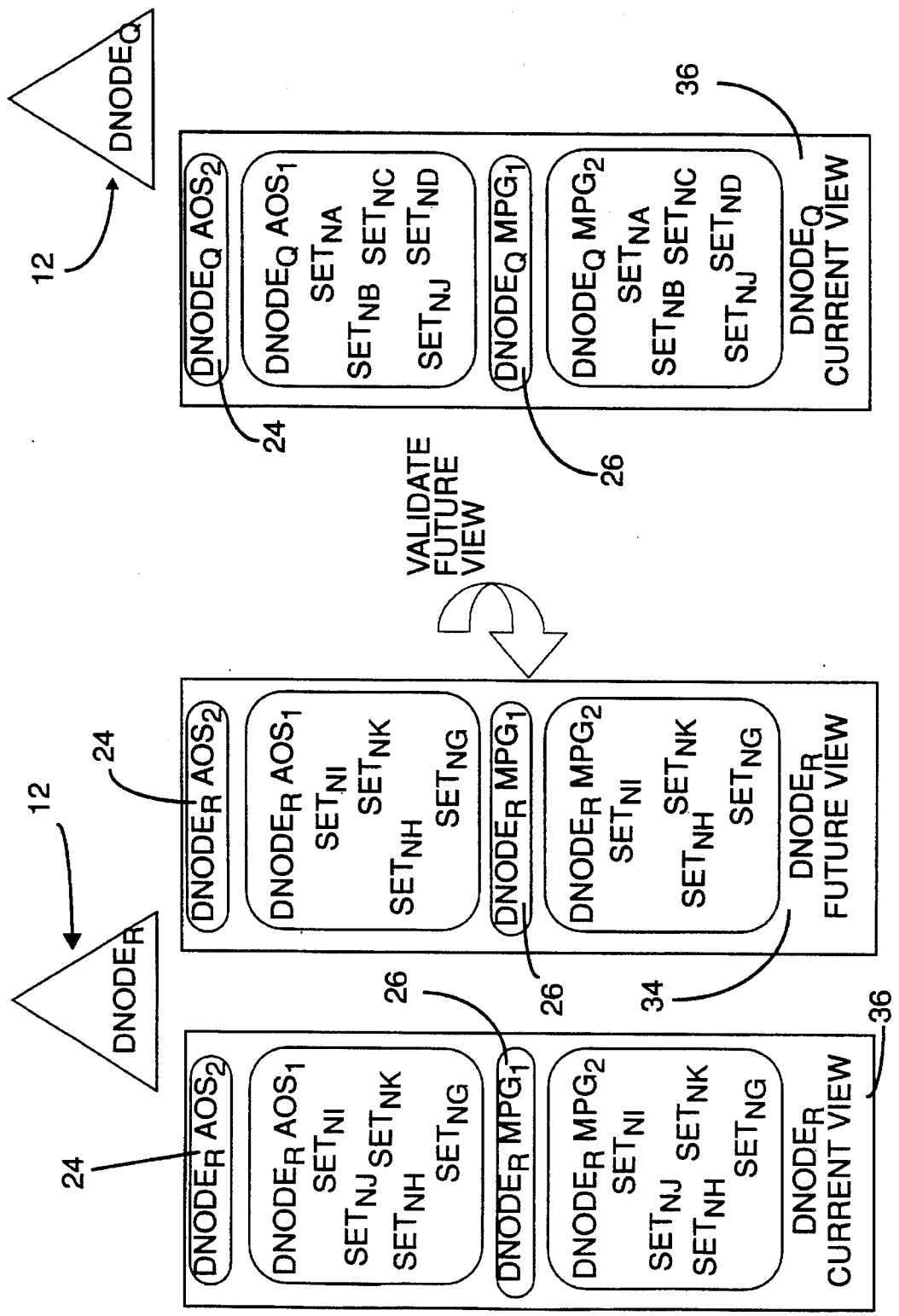
Figure 19:
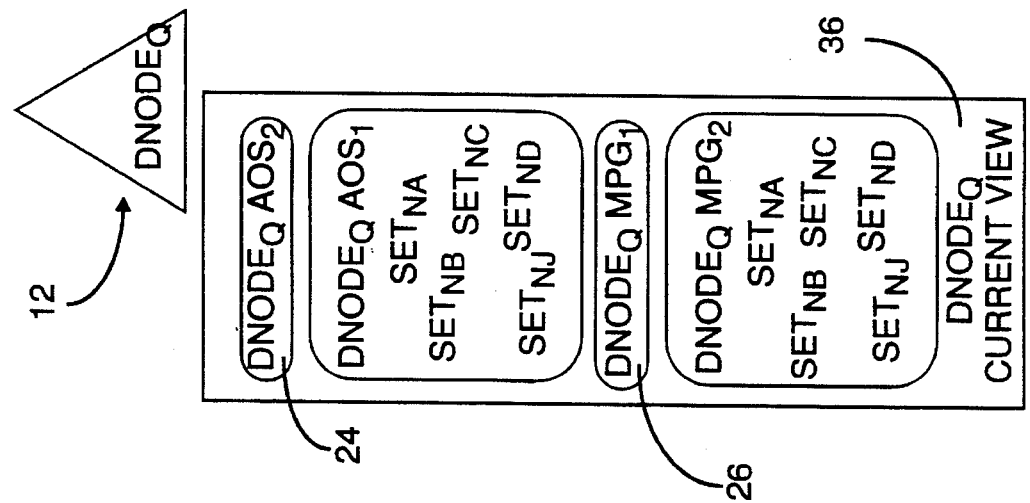
Figure 19:
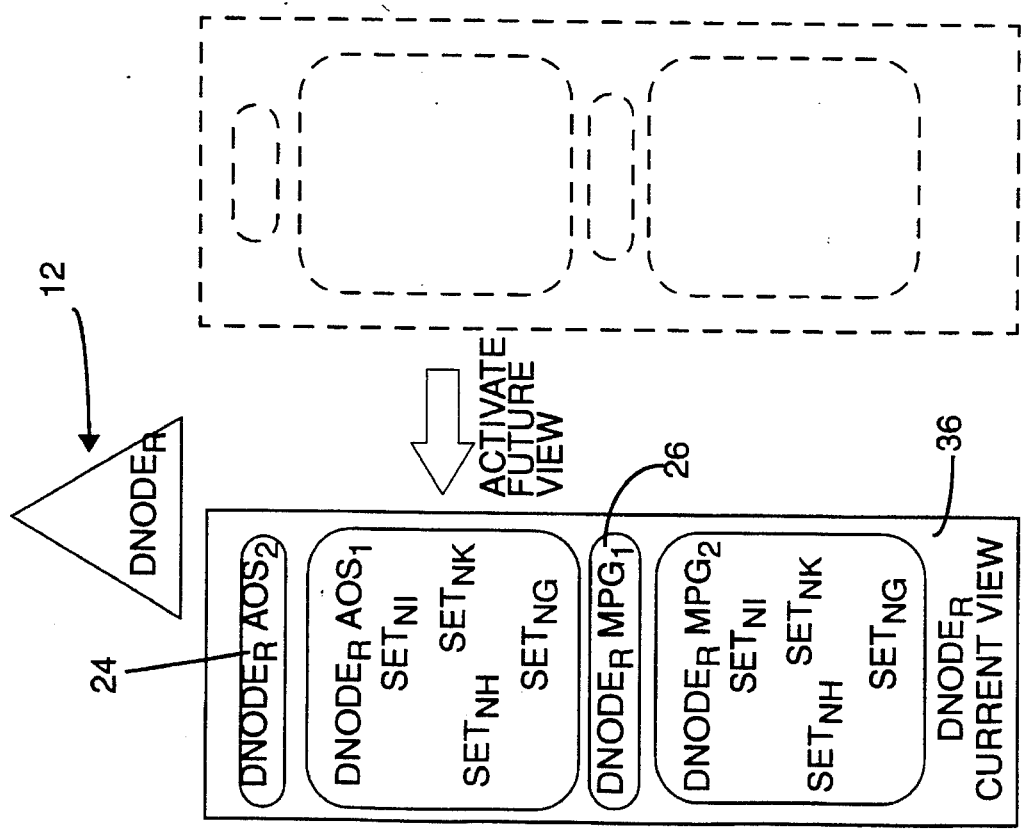

9. After the OSS has successfully downloaded all resultant data, the network translations personnel would modify the network translations. This would result in the network no longer routing the associated Requests to DNode$_R$, but rather routing them to DNode$_Q$ as reflected schematically in FIG. 15.

10. After the network translations have been successfully modified and it is verified that DNode$_Q$ is processing Requests as expected, the engineering personnel would create a DNode$_R$ Future View 34 as reflected in FIG. 16.

11. In that Future View 34 they will perform an "End Transfer" operation as reflected in FIG. 17, specifying DNode$_Q$ as the DNode 12 to which Members were earlier transferred. The operations personnel would select AOS$_1$ as the Model 15 which was operated on. The OSS would then automatically remove Set$_{Nj}$ from the DNode$_R$ Future View AOS$_1$. In that same Future View 34, engineering personnel would then perform an "End Transfer" operation specifying DNode$_Q$ as the DNode 12 to which Members were earlier transferred, and select Mapping$_2$ as the Model 15 which was operated on. The OSS would then automatically remove Set$_{Nj}$ from the DNode$_R$ Future View Mapping$_2$.

12. Engineering personnel would then perform a "Validate Future View" operation on the DNode$_R$ Future View as reflected in FIG. 18. This operation should not result in any warning messages, assuming no Application-specific rules were violated.

13. DNode administration personnel would then, at the scheduled time, "Activate" the DNode$_R$ Future View 34 as reflected in FIG. 19. This will cause the DNode$_R$ Current View 36 to change in order to reflect the values that were contained in the Future View 34.

Figure 20:
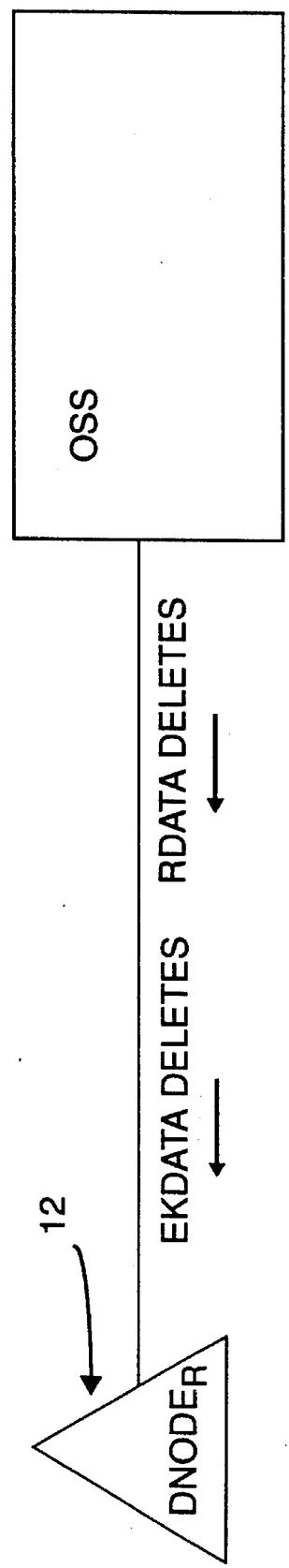
FIG. 20 is a schematic representation of data changes effected according to a preferred embodiment of the present invention.

14. As a result of the Current View 36 changing, the OSS would begin to delete the appropriate data from DNode$_R$ as reflected schematically in FIG. 20. It is expected that the DNode administration personnel would perform the activation function since, with a large volume of data activity targeted for their machine, they would want to verify at the last minute that the DNode 12 is capable of supporting this influx.

At this point the load transfer activity discussed in the example scenario is complete. Other types of displays, process steps, procedures, nomenclature, and equipment may obviously be employed which differ from this scenario or the other disclosure in this document, but which are consistent with the present invention's providing to the user an intuitive representation of Models of data stored in network elements so that the user may employ that representation in order to allocate or reallocate data to the network elements. Such differences or distinctions are properly viewed as falling within the scope and spirit of the invention.

What is claimed is:

1. A process for evaluating data storage in a network that includes at least one intelligent telecommunications network element that contains telephone call processing information ("DNode") which in turn includes at least one application and at least one resource, and at least one intelligent telecommunications network element adapted to query at least one of the DNodes in order to make requests of applications included in the DNode relating to the telephone call processing information ("RNode"), comprising the steps of:

a. providing data included in at least one DNode relating to at least one application and at least one resource used by an application included in the DNode;

b. creating a plurality of models based on the data, including at least one applications model which is adapted to include, for its application, at least one set corresponding to a predetermined grouping of translation numbers and at least one resource model which is adapted to include, for its resource, at least one set corresponding to a predetermined grouping of translation numbers;

c. evaluating (1) the volume of requests received by each application in the DNode, (2) memory in the DNode required by the application data and (3) memory in the DNode required by the resource data;

d. displaying information corresponding to the models; and e. altering data included in the DNode based on said evaluation and display.

2. A process for evaluating data storage in a network that includes a plurality of intelligent telecommunications network elements that contain telephone call processing information ("DNodes"), each of which includes a plurality of applications and at least one resource, comprising the steps of:

a. providing data included in a DNode relating to its applications and resources;

b. creating a plurality of models based on the data, including a plurality of applications models, each of which is adapted to include, for its application, at least one set of a predetermined grouping of translation numbers and at least one resource model, which is adapted to include, for its resource, at least one set of a predetermined grouping of translation numbers;

c. generating a current view display which includes representations of at least some of the models;

d. generating a future view display which initially includes representations of substantially the same models as the current view;

e. altering the group of sets in at least one application model in the future view; and f. predicting performance of the DNode using the altered future view.

3. A process according to claim 2 further comprising, after the step of altering the group of sets in at least one application models in the future view, determining whether that alteration requires that other alterations to the future view be made.

4. A process according to claim 2 in which at least one set corresponds to a predetermined category.

5. A process according to claim 2 in which at least one set corresponds to part of a predetermined category.

6. A process of apportioning data in a network that includes a plurality of intelligent telecommunications network elements that contain telephone call processing information ("DNodes"), each of which includes a plurality of applications and at least one resource, comprising the steps of:

a. providing data included in a DNode relating to its applications and resources;

b. creating a plurality of models based on the data, including a plurality of applications models, each of which is adapted to include, for its application, at least one set corresponding to a predetermined grouping of translation numbers and at least one resource model, which is adapted to include, for its resource, at least one set corresponding to a predetermined grouping of translation numbers;

c. generating a current view display which includes representations of at least some of the models;

d. generating a future view display which initially includes representations of substantially the same models as the current view;

e. changing the number of sets in at least one application model in the future view;

f. determining whether that change requires that other alterations to the future view be made;

g. predicting performance of the DNode using the changed future view; and h. altering the data in the DNode based on the changed future view.

7. A process according to claim 6 in which at least one set is a member of a set type corresponding to a predefined category.

8. A process according to claim 6 in which at least one set is a member of a set corresponding to a part of a predefined category.

9. A process according to claim 6 further comprising the step of, after altering the data in the DNode based on the changed future view, altering at least one translations table in at least one signal transfer point that communicates with the DNode.

10. A process for evaluating data storage in a network that includes a plurality of intelligent telecommunications network elements that contain telephone call processing information ("DNodes") each of which includes a plurality of applications and at least one resource, comprising the steps of:

a. providing data included in a DNode relating to its applications and resources;

b. creating a plurality of models based on the data, including a plurality of applications models, each of which is adapted to include, for its application, at least one set corresponding to a predetermined grouping of translation numbers and at least one resource model, which is adapted to include, for its resource, at least one set corresponding to a predetermined grouping of translation numbers;

c. generating a current view display which includes representations of at least some of the models;

d. generating a future view display which initially includes representations of substantially the same models as the current view;

e. adding at least one set to at least one application model in the future view; and f. predicting performance of the DNode using the altered future view.

11. A process according to claim 10 in which the set is not, at the time of alteration, associated with any model in any other DNode corresponding to the model represented by the future view.

12. A process according to claim 10 in which the set is, at the time of alteration, associated with another model in another DNode corresponding to the model represented by the future view.

13. A process according to claim 12 in which the set is removed from the other model in the other DNode after being added to the model represented in the future view.

14. A process for evaluating data storage in a network that includes a plurality of intelligent telecommunications network elements that contain telephone call processing information ("DNodes"), each of which includes a plurality of applications and at least one resource, comprising the steps of:

a. providing data included in a DNode relating to its applications and resources;

b. creating a plurality of models based on the data, including a plurality of applications models, each of which is adapted to include, for its application, at least one set corresponding to a predetermined grouping of translation numbers and at least one resource model, which is adapted to include, for its resource, at least one set corresponding to a predetermined grouping of translation numbers;

c. generating a current view display which includes representations of at least some of the models;

d. generating a future view display which initially includes representations of substantially the same models as the current view;

e. deleting at least one set from at least one application model in the future view; and f. predicting performance of the DNode using the altered future view.

15. A process for evaluating data storage in a network that includes a plurality of intelligent telecommunications network elements that contain telephone call processing information ("DNodes"), each of which includes a plurality of applications and at least one resource, comprising the steps of:

a. providing data included in a DNode relating to its applications and resources;

b. creating a plurality of models based on the data, including a plurality of applications models, each of which is adapted to include, for its application, at least one set corresponding to a predetermined grouping of translation numbers and at least one resource model, which is adapted to include, for its resource, at least one set corresponding to a predetermined grouping of translation numbers;

c. generating a current view display which includes representations of at least some of the models;

d. generating a future view display which initially includes representations of substantially the same models as the current view;

e. adding at least one set to at least one application model in the future view; and f. determining whether said addition requires addition of any other set to any model in the future view and, if so, making such additions;

g. repeating the previous step until no further additions are required;

h. predicting performance of the DNode using the altered future view;

i. adopting the altered future view as the current view; and j. adding data to the DNode based on the altered future view.

16. A process according to claim 15 in which, after the step of adding data to the DNode using the altered future view occurs, corresponding data is deleted from any other DNode having such data reflected in a model corresponding to the model represented by the future view.

17. A process according to claim 15 in which, after the step of adding data to the DNode using the altered future view occurs, the added sets are deleted from the current view of any other DNode model corresponding to the model represented by the future view.

18. A process for evaluating data storage in a network that includes a plurality of intelligent telecommunications network elements that contain telephone call processing information ("DNodes"), each of which includes a plurality of applications and at least one resource, comprising the steps of:

a. providing data included in a DNode relating to its applications and resources;

b. creating a plurality of models based on the data, including a plurality of applications models, each of which is adapted to include, for its application, at least one set corresponding to a predetermined grouping of translation numbers and at least one resource model, which is adapted to include, for its resource, at least one set corresponding to a predetermined grouping of translation numbers;

c. generating a current view display which includes representations of at least some of the models;

d. generating a future view display which initially includes representations of substantially the same models as the current view;

e. deleting at least one set from at least one application model in the future view; and f. determining whether said addition requires addition of any other set to any model in the future view and, if so, making such additions;

g. repeating the previous step until no further additions are required;

h. predicting performance of the DNode using the altered future view;

i. adopting the altered future view as the current view; and j. adding data to the DNode based on the altered future view.

19. A process according to claim 18 in which, after the step of deleting data from the DNode using the altered future view occurs, corresponding data is added to another DNode having a model corresponding to the model represented by the future view.

20. A process according to claim 18 in which, after the step of deleting data from the DNode using the altered future view occurs, the deleted sets are added to the current view of another DNode model.

21. A system for evaluating data storage in a network that includes at least one intelligent telecommunications network element that contains telephone call processing information ("DNode") which in turn includes at least one application, applications data and at least one resource, and at least one intelligent telecommunications network element adapted to query at least one of the DNodes in order to make requests of applications included in the DNode, comprising:

a. means for creating a plurality of models based on the data, including at least one applications model which is adapted to include, for its application, at least one set corresponding to a predetermined grouping of translation numbers and at least one resource model which is adapted to include, for its resource, at least one set corresponding to a predetermined grouping of translation numbers;

b. interface means for displaying information corresponding to the models and assisting in evaluation of (1) the volume of requests received by each application in the DNode; (2) memory in the DNode required by the application data and (3) memory in the DNode required by the resource data;

c. means for altering data included in the DNode based on said display and evaluation.

22. A process for managing data in a network that includes at least one intelligent telecommunications network element that contains telephone call processing information ("DNode") which in turn includes at least one application, and at least one intelligent telecommunications network element adapted to query at least one of the DNodes in order to make requests of applications included in the DNode relating to the telephone call processing information ("RNode"), comprising the steps of:

a. providing data included in at least one DNode relating to at least one application included in the DNode;

b. creating a plurality of models based on the data, including at least one applications model which is adapted to include, for its application, at least one set corresponding to a predetermined grouping of at least one translation number;

c. evaluating allocation of said sets in said DNode;

d. displaying information corresponding to the models; and e. altering data included in the DNode based on said evaluation and display.

23. A process for managing data in a network that includes at least one intelligent telecommunications network element that contains telephone call processing information ("DNode") which in turn includes at least one resource, and at least one intelligent telecommunications network element adapted to query at least one of the DNodes in order to make requests of resources included in the DNode relating to the telephone call processing information ("RNode"), comprising the steps of:

a. providing data included in at least one DNode relating to at least one resource included in the DNode;

b. creating a plurality of models based on the data, including at least one resource model which is adapted to include, for its resource, at least one set corresponding to a predetermined grouping of at least one translation number;

c. evaluating allocation of said sets in said DNode;

d. displaying information corresponding to the models; and e. altering data included in the DNode based on said evaluation and display.

* * * * *